United States Patent
Kiyomori et al.

(10) Patent No.: US 10,494,507 B2
(45) Date of Patent: Dec. 3, 2019

(54) PHOTOCURABLE COMPOSITION AND CURED PRODUCT

(71) Applicant: Shin-Etsu Chemical Co., Ltd., Tokyo (JP)

(72) Inventors: Ayumu Kiyomori, Joetsu (JP); Yusuke Itoh, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/154,240

(22) Filed: May 13, 2016

(65) Prior Publication Data

US 2016/0333171 A1    Nov. 17, 2016

(30) Foreign Application Priority Data

May 15, 2015    (JP) .................................. 2015-100113

(51) Int. Cl.
  *C08K 5/5419*    (2006.01)
  *C08F 283/12*    (2006.01)
  *C08F 2/48*    (2006.01)

(52) U.S. Cl.
  CPC .................................. *C08K 5/5419* (2013.01)

(58) Field of Classification Search
  CPC ......... C08K 5/5419; C08F 283/12; C08F 2/48
  See application file for complete search history.

(56) References Cited

U.S. PATENT DOCUMENTS

| | | | | |
|---|---|---|---|---|
| 5,935,711 A | * | 8/1999 | Pocius | ...................... C08F 4/52 428/355 AC |
| 6,343,129 B1 | | 1/2002 | Pelrine et al. | |
| 7,034,432 B1 | | 4/2006 | Pelrine et al. | |
| 7,842,390 B2 | | 11/2010 | Chung et al. | |
| 2004/0202625 A1 | * | 10/2004 | Daniloff | ................. A61L 31/14 424/63 |
| 2008/0249271 A1 | | 10/2008 | Beppu et al. | |
| 2014/0066538 A1 | * | 3/2014 | Sakamoto | ............ C09D 11/107 522/16 |

FOREIGN PATENT DOCUMENTS

| | | |
|---|---|---|
| EP | 0868732 A1 | 10/1998 |
| JP | 2000-501549 A | 2/2000 |
| JP | 2001-524278 A | 11/2001 |
| JP | 2003-505865 A | 2/2003 |
| JP | 2006-290939 A | 10/2006 |

(Continued)

OTHER PUBLICATIONS

SU 548824, machine English translation of abstract (Year: 1977).*

(Continued)

*Primary Examiner* — Jessica M Roswell
(74) *Attorney, Agent, or Firm* — Birch, Stewart, Kolasch & Birch, LLP

(57) ABSTRACT

A photocurable composition comprising (a) a cyano-containing silsesquioxane, (b) a cyano-containing ethylenically unsaturated monofunctional monomer, (c) an ethylenically unsaturated polyfunctional monomer, and (d) a photo-polymerization initiator has a long shelf life under light-shielded conditions. A cured product obtained by curing the photocurable composition is a polymeric material which is transparent and lightweight and has a high dielectric constant.

6 Claims, 11 Drawing Sheets

(56) References Cited

FOREIGN PATENT DOCUMENTS

| JP | 2007-153961 A | | 6/2007 | |
|---|---|---|---|---|
| JP | 2010-505995 A | | 2/2010 | |
| SU | 548827 | * | 4/1977 | ............... G03C 1/68 |
| WO | WO 97/20324 A1 | | 5/1997 | |

OTHER PUBLICATIONS

Extended European Search Report dated Sep. 19, 2016, in European Patent Application No. 16169088.8.
Ghasaban et al., "Photo-crosslinkable cyanoacrylate bioadhesive: Shrinkage kinetics, dynamic mechanical properties, and biocompatibility of adhesives containing TMPTMA and POSS nanostructures as crosslinking agents," J. Biomed. Mater. Res. Part A: 99A (2011), pp. 240-248.

* cited by examiner

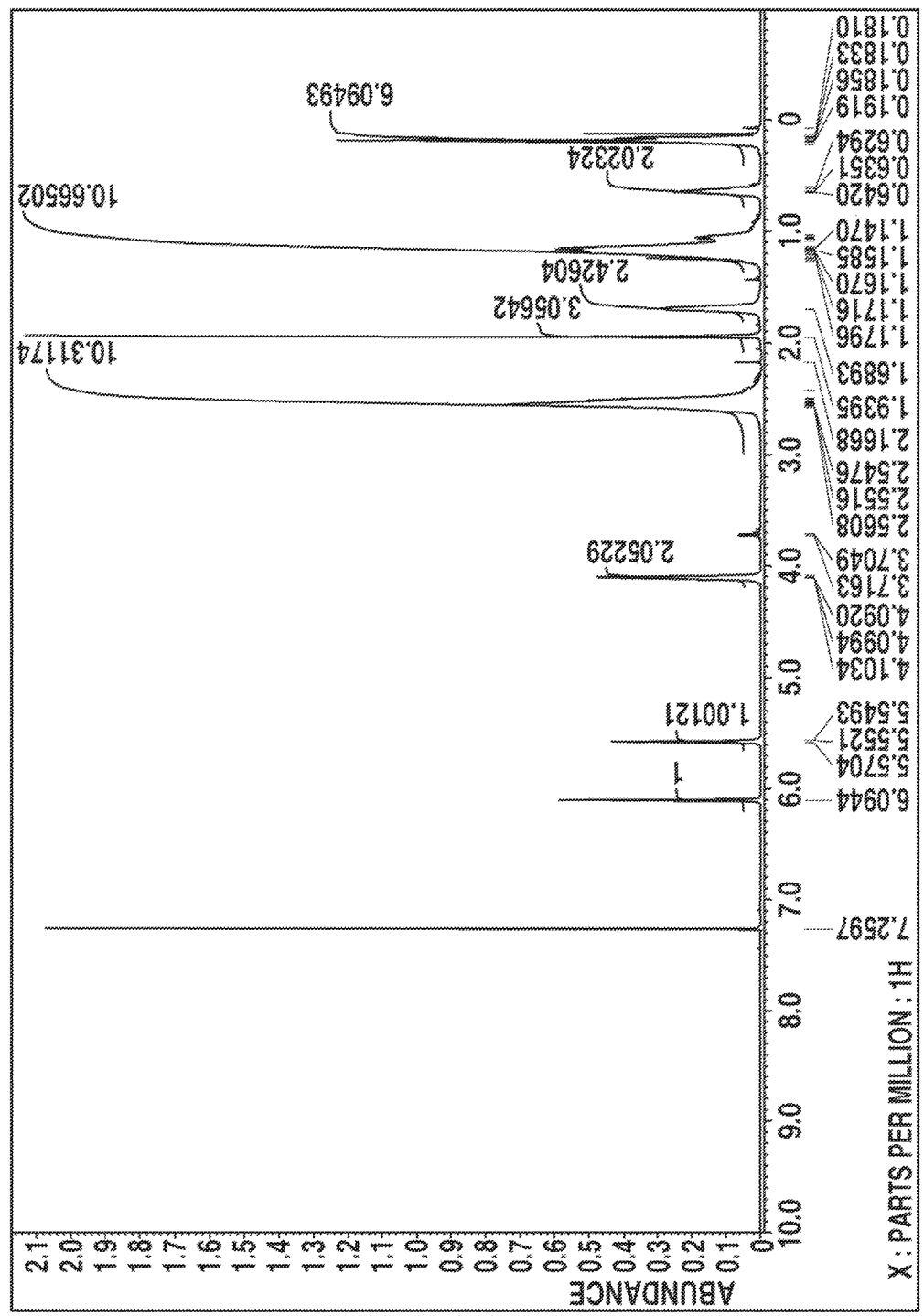

PHOTOCURABLE COMPOSITION AND CURED PRODUCT

CROSS-REFERENCE TO RELATED APPLICATION

This non-provisional application claims priority under 35 U.S.C. § 119(a) on Patent Application No. 2015-100113 filed in Japan on May 15, 2015, the entire contents of which are hereby incorporated by reference.

TECHNICAL FIELD

This invention relates to a photocurable composition and a cured product thereof.

BACKGROUND ART

Polymeric materials are generally characterized by electric insulation, flexibility and light weight. They are used in electric and electronic applications, for example, as dielectrics in film capacitors, field effect transistors, resin antennas, and the like. Also transparent resins allowing for light transmission are useful materials finding widespread use in optical devices such as lenses and waveguides and imaging devices such as displays.

The film capacitors are required to have a greater capacitance and a smaller size. It is known that the capacitance of a film capacitor is in proportion to the dielectric constant of a film and in inverse proportion to the thickness thereof. Therefore, among films of an identical thickness, a film having a higher dielectric constant is preferable, because the capacitance of a capacitor is increased, that is, a film capacitor of higher capacitance is obtainable. Although polymeric materials such as polypropylene, polyester and polyphenylene sulfide are often used in the film capacitors, they have a low dielectric constant when used alone. One solution is disclosed in Patent Document 1 as a polymer composition comprising polyphenylene sulfide and a dielectric ceramic such as strontium titanate, which is used in capacitors and antennas.

With respect to the material for use in resin antennas, Patent Document 2 discloses a dielectric elastomer laminate including an intermediate layer of an elastomer having a dielectric ceramic added thereto to increase its dielectric constant. It contributes to the manufacture of antennas of higher frequency and smaller size. As to synthetic resins for use as the insulating film in FETs, a resin with a higher dielectric constant is preferable because the transistor capacitance is increased.

An actuator adapted to convert an input of certain energy to an output of mechanical energy is one of transducers. The actuator is divided into several types. Since an actuator using a dielectric elastomer or polymeric material is capable of converting electrical energy to mechanical energy and takes the form of a flexible thin film, its application to a variety of equipment such as micro-pumps and speakers is under study (see Patent Document 3). Inversely, it is also known to use a dielectric elastomer in a transducer capable of converting mechanical energy to electrical energy (see Patent Document 4). An amount of deflection induced upon application of a voltage to a dielectric elastomer sandwiched between electrodes is in proportion to the dielectric constant of the elastomer. For the purpose of achieving a higher energy conversion efficiency, it is desirable to increase the dielectric constant. For example, Patent Document 5 discloses a dielectric elastomer which is obtained by dispersing dielectric ceramic particles having a dielectric constant of at least 1,000 in crosslinked rubber.

In these applications, resins having a high dielectric constant are needed. The dielectric constant of a polymeric material may be increased by blending a dielectric ceramic such as strontium titanate therein. To gain a satisfactory effect, the ceramic must be blended in a large amount, which undesirably causes the material to become hard and difficult to mold. In order that an inorganic material such as dielectric ceramic be mixed and dispersed uniformly in a polymeric material, a special treatment, for example, surface treatment with silane coupling agents is necessary. Further, the dielectric ceramic has a high specific gravity, which can detract from the lightweight feature characteristic of polymeric material.

Patent Document 6 describes the use of fluoro-polymers having a high dielectric constant such as vinylidene fluoride. However, the fluoro-polymers are expensive and less versatile.

CITATION LIST

Patent Document 1: JP-A 2000-501549
Patent Document 2: JP-A 2006-290939
Patent Document 3: JP-A 2001-524278 (U.S. Pat. No. 6,343,129)
Patent Document 4: JP-A 2003-505865 (U.S. Pat. No. 7,034,432)
Patent Document 5: JP-A 2007-153961
Patent Document 6: JP-A 2010-505995 (U.S. Pat. No. 7,842,390)

DISCLOSURE OF INVENTION

It is thus desired to increase the dielectric constant of a polymeric material without detrimental impacts on its inherent features including lightweight, molding and mechanical properties.

An object of the invention is to provide a photocurable composition which is effectively moldable and forms a polymeric material having lightweight and a high dielectric constant, and a cured product thereof.

The inventors have found that a transparent lightweight polymeric material having a high dielectric constant is obtained by curing a photocurable composition comprising a cyano-containing silsesquioxane, a specific monomer, and a photo-polymerization initiator.

In one aspect, the invention provides a photocurable composition comprising (a) a silsesquioxane having a cyano group, (b) an ethylenically unsaturated monofunctional monomer having a cyano group, (c) an ethylenically unsaturated polyfunctional monomer, and (d) a photo-polymerization initiator. Component (a) is a silsesquioxane having the general formula (1).

$$(NC-A-SiO_{3/2})_m(NC-A-SiRO_{2/2})_n(NC-A-SiR_2O_{1/2})_p \\ (G-B-SiO_{3/2})_q(G-B-SiR^1O_{2/2})_r(G-B-SiR^1_2O_{1/2})_s \quad (1)$$

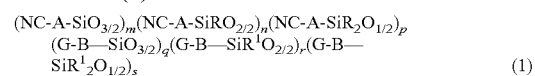

Herein A and B are each independently a $C_1$-$C_{10}$ divalent hydrocarbon group, R and $R^1$ are each independently a $C_1$-$C_6$ monovalent hydrocarbon group, $C_1$-$C_3$ alkoxy group, hydroxyl group or $C_3$-$C_{20}$ triorganosiloxy group, G is a $C_1$-$C_8$ alkyl group or $C_1$-$C_3$ alkoxy group, in which one or two hydrogen atoms are substituted by a monovalent substituent selected from the group consisting of a carboxyl group, $C_2$-$C_4$ ester group, hydroxyl group, $C_2$-$C_6$ epoxide-containing group, $C_3$-$C_6$ α,β-unsaturated acyloxy group, $C_2$-$C_3$ alkenyl group, and $C_4$-$C_8$ acid anhydride-containing group, m, n, p, q, r and s are each independently an integer of 0 to 200, the sum m+q is at least 4, the sum m+n+p is 4 to 200, and the sum m+n+p+q+r+s is 4 to 200.

In a preferred embodiment, component (b) is an α,β-unsaturated carboxylic acid ester having a cyano group or α,β-unsaturated nitrile.

In a preferred embodiment, component (c) is an α,β-unsaturated carboxylic acid ester of a polyhydric alcohol.

In a preferred embodiment, the composition may further comprise (e) an ethylenically unsaturated monofunctional monomer free of a cyano group and (f) a solvent.

A cured product of the photocurable composition defined above is also provided.

In another aspect, the invention provides a polymeric material which is obtained by curing a mixture of a polymer of chain or network structure and the photocurable composition defined above, the polymeric material having an interpenetrating polymer network (IPN) or semi-interpenetrating polymer network structure.

Advantageous Effects of Invention

The photocurable composition of the invention may be readily prepared. It remains stable or has a long shelf life when stored under light-shielded conditions. A cured product obtained by curing the photocurable composition is a polymeric material having a high dielectric constant (or relative permittivity). This polymeric material is transparent because constituents are uniformly mixed therein without agglomeration, and lightweight because it is free of ceramics having a high specific gravity.

BRIEF DESCRIPTION OF DRAWINGS

FIG. 11 is a diagram showing $^1$H-NMR spectrum (in deuterated chloroform) of the silsesquioxane in Synthesis Example 6.

DESCRIPTION OF PREFERRED EMBODIMENTS

Figure 1:
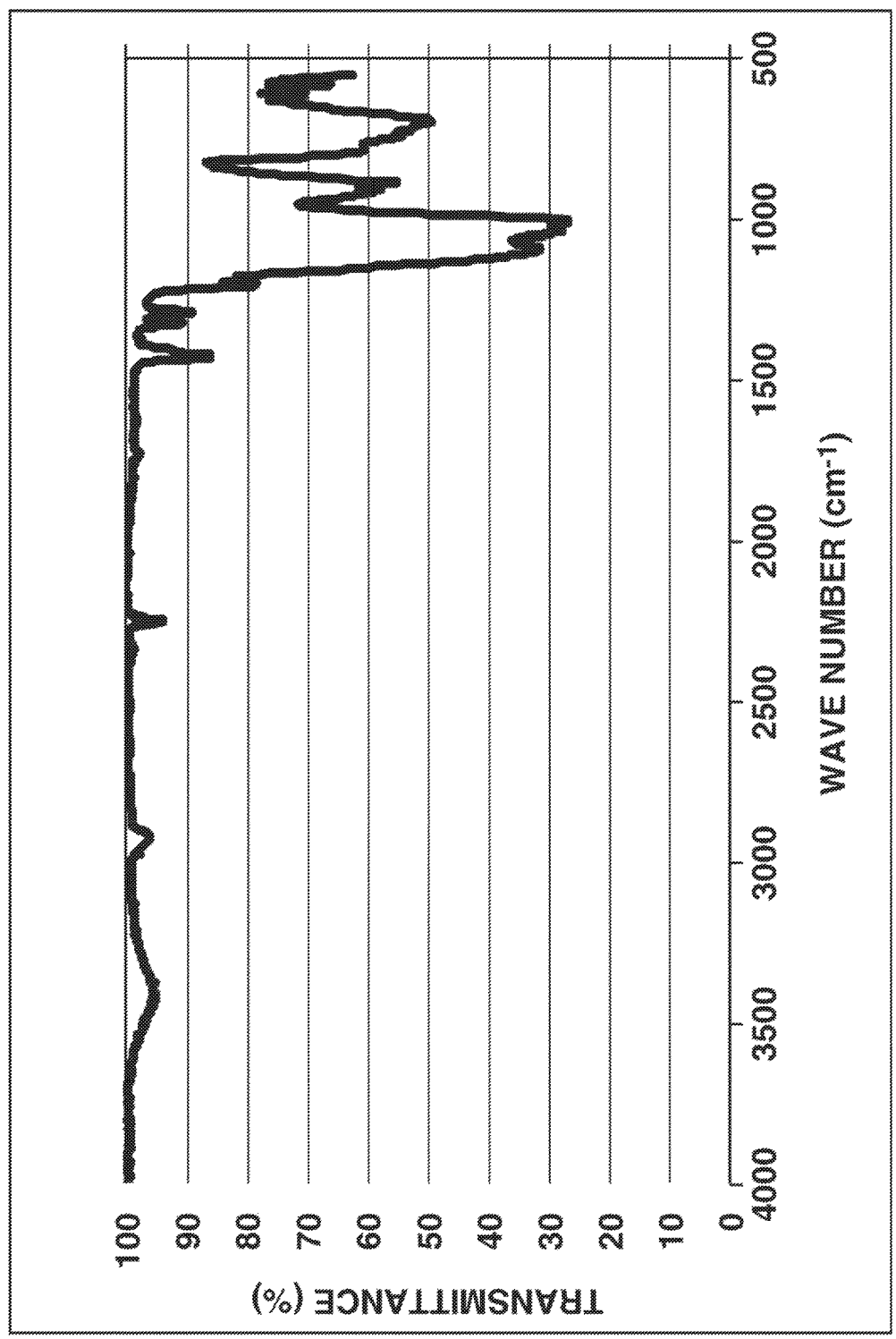
FIG. 1 is a diagram showing IR spectrum of a silsesquioxane in Synthesis Example 1.

The notation (Cn-Cm) means a group containing from n to m carbon atoms per group. As employed herein, the terminology "(meth)acrylic" is intended to mean "acrylic or methacrylic".

First, components of the photocurable composition are described.

(a) Cyano-Containing Silsesquioxane

The photocurable composition essentially comprises (a) a silsesquioxane having a cyano group, represented by the general formula (1).

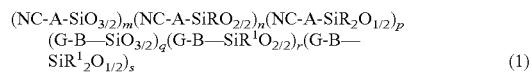

$$(NC\text{-}A\text{-}SiO_{3/2})_m(NC\text{-}A\text{-}SiRO_{2/2})_n(NC\text{-}A\text{-}SiR_2O_{1/2})_p$$
$$(G\text{-}B\text{-}SiO_{3/2})_q(G\text{-}B\text{-}SiR^1O_{2/2})_r(G\text{-}B\text{-}SiR^1_2O_{1/2})_s \qquad (1)$$

In formula (1), A and B are each independently a $C_1$-$C_{10}$, preferably $C_1$-$C_6$, divalent hydrocarbon group. Examples of groups A and B include divalent linear aliphatic hydrocarbon groups such as methylene, ethanediyl, ethenediyl, propanediyl, butanediyl, pentanediyl, hexanediyl, heptanediyl, octanediyl, nonanediyl, and decanediyl; divalent branched aliphatic hydrocarbon groups such as 2-methylpropanediyl, 2-methylbutanediyl, and 3-methylpentanediyl; divalent cyclic aliphatic hydrocarbon groups such as cyclohexanediyl; and divalent aromatic hydrocarbon groups such as 1,3-benzenediyl, 1,4-benzenediyl, 2-methyl-1,4-benzenediyl, 3-methyl-1,4-benzenediyl, 2,5-dimethyl-1,4-benzenediyl, 1,4-naphthalenediyl, 2,6-naphthalenediyl, 2,7-naphthalenediyl, 4-ethylbenzene-1,2-diyl, and 4-propylbenzene-1,3-diyl.

In formula (1), R and $R^1$ are each independently a $C_1$-$C_6$ monovalent hydrocarbon group, $C_1$-$C_3$ alkoxy group, hydroxyl group or $C_3$-$C_{20}$ triorganosiloxy group. Suitable $C_1$-$C_6$ monovalent hydrocarbon groups include linear or branched alkyl groups such as methyl, ethyl, propyl, isopropyl, butyl, s-butyl, isobutyl, pentyl, isopentyl, neopentyl, hexyl and isohexyl; cyclic alkyl groups such as cyclopropyl, cyclobutyl, cyclopentyl, and cyclohexyl; and aryl groups such as phenyl. Suitable $C_1$-$C_3$ alkoxy groups include methoxy, ethoxy, propoxy and isopropoxy.

In the triorganosiloxy group represented by R and $R^1$, the substituent on the silicon atom is typically selected from $C_1$-$C_{18}$ hydrocarbon groups. Examples include linear alkyl groups such as methyl, ethyl, propyl, butyl, pentyl, hexyl, heptyl, octyl, nonyl, decyl, dodecyl, tetradecyl, hexadecyl and octadecyl; branched alkyl groups such as isopropyl, sec-butyl, tert-butyl, isobutyl, isopentyl, neopentyl, isohexyl, and 2-ethylhexyl; cyclic alkyl groups such as cyclopropyl, cyclobutyl, cyclopentyl, cyclohexyl, tert-butylcyclohexyl, and cyclooctyl; aryl groups such as phenyl, tolyl, xylyl, mesityl, naphthyl, and biphenyl; and aralkyl groups such as benzyl, phenethyl and phenylpropyl.

Examples of the $C_3$-$C_{20}$, preferably $C_3$-$C_{10}$, triorganosiloxy group include trimethylsiloxy, ethyldimethylsiloxy, propyldimethylsiloxy, isopropyldimethylsiloxy, butyldimethylsiloxy, sec-butyldimethylsiloxy, tert-butyldimethylsiloxy, isobutyldimethylsiloxy, pentyldimethylsiloxy, isopentyldimethylsiloxy, neopentyldimethylsiloxy, hexyldimethylsiloxy, isohexyldimethylsiloxy, heptyldimethylsiloxy, octyldimethylsiloxy, 2-ethylhexyldimethylsiloxy, nonyldimethylsiloxy, decyldimethylsiloxy, dodecyldimethylsiloxy, tetradecyldimethylsiloxy, hexadecyldimethylsiloxy, octadecyldimethylsiloxy, cyclopropyldimethylsiloxy, cyclobutyldimethylsiloxy, cyclopentyldimethylsiloxy, cyclohexyldimethylsiloxy, cyclooctyldimethylsiloxy, phenyldimethylsiloxy, tolyldimethylsiloxy, xyloxydimethylsiloxy, mesityldimethylsiloxy, naphthyldimethylsiloxy, biphenyldimethylsiloxy, benzyldimethylsiloxy, phenethyldimethylsiloxy, (phenylpropyl)dimethylsiloxy, methyldiisopropylsiloxy, tert-pentyldimethylsiloxy, ethyldiisopropylsiloxy, thexyldimethylsiloxy, triisopropylsiloxy, propyldiisopropylsiloxy, methyldi-sec-butylsiloxy, 1-methylcyclohexyldimethylsiloxy, butyldiisopropylsiloxy, tert-butyldiisopropylsiloxy, ethyldi-sec-butylsiloxy, diethylmethylsiloxy, triethylsiloxy, phenyldiethylsiloxy, thexyldiethylsiloxy, isopropyldiisobutylsiloxy, pentyldiisopropylsiloxy, cyclopentyldiisopropylsiloxy, propyldi-sec-butylsiloxy, isopropyldi-sec-butylsiloxy, phenylisopropylethylsiloxy, methyldicyclopentylsiloxy, hexyldiisopropylsiloxy, cyclohexyldiisopropylsiloxy, phenyldiisopropylsiloxy, butyldi-sec-butylsiloxy, sec-butyldiisobutylsiloxy, ethyldicyclopentylsiloxy, benzyldiisopropylsiloxy, propyldicyclopentylsiloxy, isopropyldicyclopentylsiloxy, methyldiphenylsiloxy, octyldiisopropylsiloxy, 2-ethylhexyldiisopropylsiloxy, ethyldiphenylsiloxy, decyldiisopropylsiloxy, butyldiphenylsiloxy, tert-butyldiphenylsiloxy, dodecyldiisopropylsiloxy, and tetradecyldiisopropylsiloxy.

In formula (1), G is a $C_1$-$C_8$, preferably $C_1$-$C_3$, alkyl group or $C_1$-$C_3$ alkoxy group, in which one or two hydrogen atoms are substituted by a monovalent substituent selected from among a carboxyl group, $C_2$-$C_4$ ester group, hydroxyl group, $C_2$-$C_6$ epoxide-containing group, $C_3$-$C_6$ α,β-unsaturated acyloxy group, $C_2$-$C_3$ alkenyl group, and $C_4$-$C_8$ acid anhydride-containing group. Examples of the alkyl group which is the skeleton of group G include linear alkyl groups such as methyl, ethyl, propyl, butyl, pentyl, hexyl, heptyl and octyl; branched alkyl groups such as isopropyl, isobutyl, sec-butyl, tert-butyl, isopentyl, neopentyl, 2-pentyl, 3-pentyl, isohexyl, and 2-ethylhexyl; and cyclic alkyl groups such as cyclopentyl, cyclohexyl, cycloheptyl, and cyclooctyl. Examples of the alkoxy group which is the skeleton of group G include methoxy, ethoxy, propoxy, and isopropoxy.

Examples of the monovalent substituent substituting for a hydrogen atom in the group G include carboxyl; ester groups such as methoxycarbonyl, ethoxycarbonyl, propoxycarbonyl, and isopropoxycarbonyl; hydroxyl; epoxide-containing groups such as glycidyl, glycidyloxy, glycidyloxycarbonyl, and 3,4-epoxycyclohexyl; α,β-unsaturated acyloxy groups such as acryloyloxy and methacryloyloxy; alkenyl groups such as vinyl, allyl and methallyl; succinic anhydride; and acid anhydride-containing groups such as 3,4-phthalic anhydride.

In formula (1), m, n, p, q, r and s are each independently an integer of 0 to 200; the sum m+q is at least 4, preferably 6 to 150, more preferably 6 to 100. If m+q<4, a compound of formula (1) will readily volatilize off the composition or cured product because of a low molecular weight. If m+q exceeds 150, then a compound of formula (1) may be less compatible with other components in the composition, making it difficult to form a uniform composition.

In formula (1), the sum m+n+p is in a range of 4 to 200, preferably 6 to 150, and more preferably 6 to 100. If m+n+p<4, a compound of formula (1) will readily volatilize off the composition or cured product because of a low molecular weight, or a compound of formula (1) becomes less effective for improving dielectric constant because of a low cyano content. If m+n+p exceeds 200, then a compound of formula (1) becomes less compatible with other components in the composition, making it difficult to form a uniform composition.

In formula (1), the total sum m+n+p+q+r+s is 4 to 200, preferably 6 to 150, and more preferably 6 to 100. If m+n+p+q+r+s<4, a compound of formula (1) will readily volatilize off the composition or cured product because of a low molecular weight. If m+n+p+q+r+s exceeds 200, then a compound of formula (1) becomes less compatible with other components in the composition, making it difficult to form a uniform composition.

In formula (1), m/q or (m+n+p)/(q+r+s) is preferably at least 0.5, more preferably at least 0.8, and even more preferably at least 1. If (m+n+p)/(q+r+s)<0.5, a compound of formula (1) may become less effective for improving dielectric constant because of a low cyano content. The upper limit of m/q or (m+n+p)/(q+r+s) is preferably up to 100, more preferably up to 50, and even more preferably up to 20, though not critical.

From the aspect of stability of a cured product or compatibility with other components, the cyano-containing silsesquioxane having formula (1) should preferably have a number average molecular weight (Mn) of 300 to 50,000, more preferably 400 to 40,000, and even more preferably 500 to 30,000, as measured by gel permeation chromatography (GPC) versus polystyrene standards. From the aspect of uniformity, the silsesquioxane having formula (1) should preferably have a dispersity (Mw/Mn) of 1.0 to 2.0, more preferably 1.0 to 1.8, and even more preferably 1.0 to 1.6.

The silsesquioxane having formula (1) may be used alone or in admixture when it is added to the photocurable composition. When the compound having formula (1) is prepared from a hydrolyzable silane(s) by the method to be described below, it is convenient to use a mixture of such compounds.

In the photocurable composition, the silsesquioxane having formula (1) as component (a) is present in an amount of 1 to 90% by weight, preferably 5 to 70% by weight, and more preferably 10 to 50% by weight, based on the total weight of components (a) and (b), as viewed from the aspect of dielectric constant of a cured product or transparency of a composition.

The cyano-containing silsesquioxane having formula (1) may be prepared, for example, by hydrolytic condensation of a cyano-containing silane having the general formula (2), (3) or (4). Alternatively, the silsesquioxane may be prepared by cohydrolytic condensation of a cyano-containing silane having the general formula (2), (3) or (4) and a silane having the general formula (5), (6) or (7).

NC-A-SiX$_3$                                          (2)

NC-A-SiRX$_2$                                         (3)

NC-A-SiR$_2$X                                         (4)

G-B—SiY$_3$                                           (5)

G-B—SiR$^1$Y$_2$                                      (6)

G-B—SiR$^1{}_2$Y                                      (7)

In formulae (2), (3) and (4), A and R are as defined in formula (1). X is a group which becomes hydrolyzable when bonded to the silicon atom. Suitable hydrolyzable groups include $C_1$-$C_3$ alkoxy groups, $C_1$-$C_3$ acyloxy groups and halogen atoms. Specific examples include alkoxy groups such as methoxy, ethoxy, propoxy, and isopropoxy, acyloxy groups such as acetoxy and propanoyloxy, and halogen atoms such as chloro, bromo and iodo.

In formulae (5), (6) and (7), G, B and $R^1$ are as defined in formula (1). Y is a group which becomes hydrolyzable when bonded to the silicon atom, examples of which are the same as exemplified for X.

In preparing the cyano-containing silsesquioxane having formula (1), a silane having the general formula (8) may also be used in the co-hydrolytic condensation step.

Z—SiR$^2{}_3$                                        (8)

In formula (8), Z is a group which becomes hydrolyzable when bonded to the silicon atom, examples of which are the same as exemplified for X and Y. $R^2$ is each independently a $C_1$-$C_{18}$, preferably $C_1$-$C_6$, monovalent hydrocarbon group, with the proviso that the total number of carbon atoms in three $R^2$ groups is 3 to 20, preferably 3 to 10. Examples of group $R^2$ include linear alkyl groups such as methyl, ethyl, propyl, butyl, pentyl, hexyl, heptyl, octyl, nonyl, decyl, dodecyl, tetradecyl, hexadecyl and octadecyl; branched alkyl groups such as isopropyl, sec-butyl, tert-butyl, isobutyl, isopentyl, neopentyl, isohexyl, and 2-ethylhexyl; cyclic alkyl groups such as cyclopropyl, cyclobutyl, cyclopentyl, cyclohexyl, and norbornyl; aryl groups such as phenyl, tolyl, and naphthyl; and aralkyl groups such as benzyl and phenethyl.

Examples of the $C_3$-$C_{20}$ triorganosilyl group: $SiR^2_3$ include trimethylsilyl, ethyldimethylsilyl, propyldimethylsilyl, isopropyldimethylsilyl, butyldimethylsilyl, sec-butyldimethylsilyl, tert-butyldimethylsilyl, isobutyldimethylsilyl, pentyldimethylsilyl, isopentyldimethylsilyl, neopentyldimethylsilyl, hexyldimethylsilyl, isohexyldimethylsilyl, heptyldimethylsilyl, octyldimethylsilyl, 2-ethylhexyldimethylsilyl, nonyldimethylsilyl, decyldimethylsilyl, dodecyldimethylsilyl, tetradecyldimethylsilyl, hexadecyldimethylsilyl, octadecyldimethylsilyl, cyclopropyldimethylsilyl, cyclobutyldimethylsilyl, cyclopentyldimethylsilyl, cyclohexyldimethylsilyl, cyclooctyldimethylsilyl, phenyldimethylsilyl, tolyldimethylsilyl, xylyldimethylsilyl, mesityldimethylsilyl, naphthyldimethylsilyl, biphenyldimethylsilyl, benzyldimethylsilyl, phenethyldimethylsilyl, (phenylpropyl)dimethylsilyl, methyldiisopropylsilyl, tert-pentyldimethylsilyl, ethyldiisopropylsilyl, thexyldimethylsilyl, triisopropylsilyl, propyldiisopropylsilyl, methyldi-sec-butylsilyl, 1-methylcyclohexyldimethylsilyl, butyldiisopropylsilyl, tert-butyldiisopropylsilyl, ethyldi-sec-butylsilyl, diethylmethylsilyl, triethylsilyl, phenyldiethylsilyl, thexyldiethylsilyl, isopropyldiisobutylsilyl, pentyldiisopropylsilyl, cyclopentyldiisopropylsilyl, propyldi-sec-butylsilyl, isopropyldi-sec-butylsilyl, phenylisopropylethylsilyl, methyldicyclopentylsilyl, hexyldiisopropylsilyl, cyclohexyldiisopropylsilyl, phenyldiisopropylsilyl, butyldi-sec-butylsilyl, sec-butyldiisobutylsilyl, ethyldicyclopentylsilyl, benzyldiisopropylsilyl, propyldicyclopentylsilyl, isopropyldicyclopentylsilyl, methyldiphenylsilyl, 2-ethylhexyldiisopropylsilyl, octyldiisopropylsilyl, ethyldiphenylsilyl, decyldiisopropylsilyl, butyldiphenylsilyl, tert-butyldiphenylsilyl, dodecyldiisopropylsilyl, and tetradecyldiisopropylsilyl.

In preparing the silsesquioxane having formula (1), cyano-containing silanes having formulae (2), (3) and (4) may be used alone or in admixture of two or more. When silanes having formulae (5), (6), (7) and (8) are co-present, they may be used alone or in admixture of two or more. It is noted that when two or more silanes are used, a ratio of silanes must be adjusted such that the sum m+q in formula (1) may be at least 4. Also, the ratio of silanes should preferably be adjusted such that (m+n+p)/(q+r+s) in formula (1) may be at least 0.5.

Hydrolytic condensation of cyano-containing silanes having formulae (2), (3) and (4) may be carried out by any well-known methods. For example, a cyano-containing silane is reacted with water in a solvent. Suitable solvents used herein include hydrocarbons such as hexane, heptane, octane, isooctane, decane, toluene, xylene, and mesitylene, alcohols such as methanol, ethanol, propanol, 2-propanol, butanol, 2-butanol, and tert-butanol, nitriles such as acetonitrile, propionitrile and benzonitrile, amides such as dimethylformamide, dimethylacetamide, and N-methylpyrrolidone, and ethers such as diethyl ether, tetrahydrofuran, cyclopentyl methyl ether, and 1,2-dimethoxyethane. The reaction may be accelerated by adding an acid or base as a catalyst to the reaction mixture or heating the reaction mixture.

Suitable acids which can be used as the catalyst include carboxylic acids such as formic acid, acetic acid, propionic acid, citric acid and benzoic acid, sulfonic acids such as methanesulfonic acid, toluenesulfonic acid and dodecylbenzenesulfonic acid, and mineral acids such as hydrochloric acid, sulfuric acid, nitric acid and phosphoric acid. Suitable bases include amines such as ethyldimethylamine, diethylmethylamine, triethylamine, tributylamine, and diisopropylethylamine, and inorganic bases such as sodium hydroxide, potassium hydroxide, cesium hydroxide, ammonium carbonate, sodium carbonate, potassium carbonate, ammonium hydrogencarbonate, sodium hydrogencarbonate, and potassium hydrogencarbonate.

A similar method may be employed in carrying out hydrolytic condensation of a cyano-containing silane having formula (2) in the co-presence of one or more silanes having formulae (5), (6), (7) and (8).

In the silsesquioxane of formula (1) obtained from hydrolytic condensation of silanes having formulae (2) to (8), some substituent groups X and Y which have not been hydrolyzed, and hydroxyl groups corresponding to substituent groups X and Y which have been hydrolyzed, but not condensed may be left as substituents R and $R^1$. In the silsesquioxane of formula (1), it is preferred from the aspect of stability of a composition or cured product that a proportion of silicon atoms having substituent groups X and Y and hydroxyl groups bonded thereto be 0 to 25 mol %, more preferably 0 to 15 mol % of all silicon atoms.

(b) Cyano-Containing Ethylenically Unsaturated Monofunctional Monomer

Component (b) is an ethylenically unsaturated monofunctional monomer having a cyano group. When used along with component (a), it functions as a compatibilizing agent for forming a uniform transparent composition.

Typical of the cyano-containing ethylenically unsaturated monofunctional monomer as component (b) are α,β-unsaturated carboxylic acid esters having a cyano group, α,β-unsaturated nitriles, and α-cyanoacrylic acid esters. Inter alia, α,β-unsaturated carboxylic acid esters having a cyano group are preferable, as viewed from a balance of stability and reactivity. The cyano-containing ethylenically unsaturated monofunctional monomers as component (b) may be used alone or in admixture.

Examples of the cyano-containing ethylenically unsaturated monofunctional monomer as component (b) include α,β-unsaturated carboxylates having a cyano group such as 2-cyanoethyl (meth)acrylate, 3-cyanopropyl (meth)acrylate, and 4-cyanophenyl (meth)acrylate;

α,β-unsaturated nitriles such as (meth)acrylonitrile; and

α-cyanoacrylates such as methyl α-cyanoacrylate, ethyl α-cyanoacrylate, and tart-butyl α-cyanoacrylate.

In the photocurable composition, component (b) is present in an amount of preferably 10 to 99% by weight, more preferably 30 to 95% by weight, and even more preferably 50 to 90% by weight, based on the total weight of components (a) and (b), as viewed from the uniformity of a composition or electric properties of a cured product.

(c) Ethylenically Unsaturated Polyfunctional Monomer

Component (c) is an ethylenically unsaturated polyfunctional monomer, which functions as a crosslinker. Compounds having a plurality of ethylenically unsaturated groups may be used as component (c). Suitable compounds include α,β-unsaturated carboxylic acid esters of polyhydric alcohols and compounds having a plurality of vinyl or allyl groups. Inter alia, α,β-unsaturated carboxylic acid esters of polyhydric alcohols are preferred because a variety of structures are available so that mechanical properties of a cured product may be adjusted as desired. The ethylenically unsaturated polyfunctional monomers as component (c) may be used alone or in admixture.

Of these monomers, suitable α,β-unsaturated carboxylic acid esters of polyhydric alcohols include α,β-unsaturated carboxylic acid esters of dihydric alcohols such as
bis(4-(meth)acryloxypolyethoxyphenyl)propane,
neopentyl glycol di(meth)acrylate,
1,4-butanediol di(meth)acrylate,
1,6-hexanediol di(meth)acrylate,
1,10-decanediol di(meth)acrylate,
ethylene glycol di(meth)acrylate,
diethylene glycol di(meth)acrylate,
triethylene glycol di(meth)acrylate,
tetraethylene glycol di(meth)acrylate,
polyethylene glycol di(meth)acrylate,
dipropylene glycol di(meth)acrylate,
tripropylene glycol di(meth)acrylate,
polypropylene glycol di(meth)acrylate,
tricyclodecane dimethanol di(meth)acrylate,
bisphenol A diglycidyl ether (meth)acrylic acid adduct,
ethylene glycol diglycidyl ether (meth)acrylic acid adduct,
propylene glycol diglycidyl ether (meth)acrylic acid adduct,
diethylene glycol diglycidyl ether (meth)acrylic acid adduct,
neopentyl glycol diglycidyl ether (meth)acrylic acid adduct,
1,6-hexanediol diglycidyl ether (meth)acrylate,
phenyl glycidyl ether acrylate hexamethylene diisocyanate urethane prepolymer, and
phenyl glycidyl ether acrylate toluene diisocyanate urethane prepolymer;
α,β-unsaturated carboxylic acid esters of trihydric alcohols such as trimethylolpropane tri(meth)acrylate,
trimethylolpropane tri(meth)acrylate,
trimethylolpropane propoxylate tri(meth)acrylate,
tris(meth)acryloyloxyethyl isocyanurate,
glycerol ethoxylate tri(meth)acrylate,
glycerol propoxylate tri(meth)acrylate,
glycerol diglycidyl ether di(meth)acrylate, and
trimethylol propane triglycidyl ether tri(meth)acrylate;
α,β-unsaturated carboxylic acid esters of tetrahydric alcohols such as pentaerythritol tri(meth)acrylate,
pentaerythritol tetra(meth)acrylate,
pentaerythritol ethoxylate tetra(meth)acrylate, and
ditrimethylolpropane tetra(meth)acrylate; and
α,β-unsaturated carboxylic acid esters of penta- or polyhydric alcohols such as dipentaerythritol hexa(meth)acrylate,
pentaerythritol triacrylate hexamethylene diisocyanate urethane prepolymer,
pentaerythritol triacrylate toluene diisocyanate urethane prepolymer,
pentaerythritol triacrylate isophorone diisocyanate urethane prepolymer, and
dipentaerythritol pentaacrylate hexamethylene diisocyanate urethane prepolymer.
Suitable compounds having a plurality of vinyl or allyl groups include diallyl phthalate, triallyl trimellitate, allyl (meth)acrylate, and vinyl norbornene.

In the photocurable composition, component (c) is present in an amount of preferably 0.001 to 95% by weight, more preferably 0.01 to 90% by weight, based on the total weight of components (a), (b) and (c), as viewed from the solvent resistance or physical properties (e.g., elongation, strength) of a cured product.

(d) Photo-Polymerization Initiator

Component (d) is a photo-polymerization initiator for initiating photo-induced radical polymerization. Useful are intramolecular cleavage type photo-polymerization initiators such as alkylphenones, benzoins, acylphosphine oxides, oxime esters and biimidazoles; and hydrogen abstraction type photo-polymerization initiators such as benzophenones, thioxanthones, and α-diketones.

Examples of the initiator include alkylphenones such as 2,2-diethoxyacetophenone, 2,2-dimethoxy-2-phenylacetophenone, 1-hydroxycyclohexyl phenyl ketone,
2-hydroxy-2-methyl-1-phenylpropan-1-one,
1-[4-(2-hydroxyethoxy)phenyl]-2-hydroxy-2-methyl-1-propan-1-one,
2-hydroxy-1-{4-[4-(2-hydroxy-2-methylpropionyl)benzyl]-phenyl}-2-methylpropan-1-one,
2-methyl-1-(4-methylthiophenyl)-2-morpholinopropan-1-one,
2-benzyl-2-dimethylamino-1-(4-morpholinophenyl)-1-butanone,
and 2-(dimethylamino)-2-[(4-methylphenyl)methyl]-1-[4-(4-morpholinyl)phenyl]-1-butanone;
benzoins such as benzoin methyl ether, benzoin ethyl ether, benzoin isopropyl ether, and benzoin isobutyl ether;
acylphosphine oxides such as
(2,4,6-trimethylbenzoyl)diphenylphosphine oxide,
bis(2,4,6-trimethylbenzoyl)phenylphosphine oxide,
bis(2,4,6-trimethylbenzoyl)-2,4,4-trimethylpentylphosphine oxide;
oxime esters such as
1-[4-(phenylthio)-2-(O-benzoyloxime)]-1,2-octanedione,
1-[9-ethyl-6-(2-methylbenzoyl)-9H-carbazol-3-yl]-1-(O-acetyloxime)ethanone;
biimidazoles such as
2,2'-bis(2-chlorophenyl)-4,4',5,5'-tetraphenyl-1,2'-biimidazole,
2,2'-bis(2,4-dichlorophenyl)-4,4',5,5'-tetraphenyl-1,2'-biimidazole, and
2,2'-bis(2,4,6-trichlorophenyl)-4,4',5,5'-tetraphenyl-1,2'-biimidazole;
benzophenones such as benzophenone,
4,4'-bis(dimethylamino)benzophenone, and 2-carboxybenzophenone;
thioxanthones such as thioxanthone, 2-ethylthioxanthone, 2-isopropylthioxanthone, 2-chlorothioxanthone, 2,4-dimethylthioxanthone and 2,4-diethylthioxanthone; and
α-diketones such as camphorquinone and benzyl.

These photo-polymerization initiators may be used alone or in admixture. Inter alia, alkylphenones are preferred for compatibility in a photocurable composition.

In the photocurable composition, component (d) is present in an amount of preferably 0.001 to 10% by weight, more preferably 0.01 to 5% by weight, based on the total weight of components (a), (b), (c) and (d), as viewed from photo-cure rate and the flexibility and transparency of a cured product.

In combination with the photo-polymerization initiator, a reducing compound may be used for promoting polymerization. In particular, a combination of a hydrogen abstraction type photo-polymerization initiator with a reducing compound is effective. Typical of the reducing compound are aromatic tertiary amines. Examples of suitable amines include aminobenzoic acids such as 4-dimethylaminobenzoic acid, 4-diethylaminobenzoic acid and 3-dimethylaminobenzoic acid; aminobenzoates such as methyl 4-dimethylaminobenzoate, ethyl 4-dimethylaminobenzoate, ethyl 4-diethylaminobenzoate, lauryl 4-dimethylaminobenzoate, and
ethyl 3-dimethylaminobenzoate; and
aniline derivatives such as dimethylamino-p-toluidine, diethylamino-p-toluidine, and p-tolyldiethanolamine.

Of these aromatic tertiary amines, aminobenzoic acids and aminobenzoates are preferable. The reducing compound is added in an amount of preferably 0.001 to 20 moles, more preferably 0.005 to 10 moles per mole of the photo-polymerization initiator.

(e) Cyano-Free Ethylenically Unsaturated Monofunctional Monomer

If desired, the photocurable composition may further comprise (e) an ethylenically unsaturated monofunctional monomer free of a cyano group. By adding component (e) for copolymerization, mechanical and thermal properties of a cured product may be adjusted.

Typical of component (e) are compounds having an acryloyl or methacryloyl group and compounds having a vinyl group. Such monomers may be used alone or in admixture. Suitable monomers include (meth)acrylates such as
methyl (meth)acrylate, ethyl (meth)acrylate,
isopropyl (meth)acrylate, propyl (meth)acrylate,
isobutyl (meth)acrylate, butyl (meth)acrylate,
sec-butyl (meth)acrylate, hexyl (meth)acrylate,
2-ethylhexyl (meth)acrylate, carbitol (meth)acrylate,
cyclohexyl (meth)acrylate, tetrahydrofurfuryl (meth)acrylate,
benzyl (meth)acrylate, norbornyl (meth)acrylate,
isobornyl (meth)acrylate, norbornanyl (meth)acrylate,
dicyclopentenyl (meth)acrylate,
dicyclopentenyloxyethyl (meth)acrylate,
dicyclopentanyl (meth)acrylate,
dicyclopentanyloxyethyl (meth)acrylate,
methoxyethyl (meth)acrylate, ethoxyethyl (meth)acrylate,
2-hydroxyethyl (meth)acrylate, butoxyethyl (meth)acrylate,
phenoxyethyl (meth)acrylate,
methoxydiethylene glycol (meth)acrylate,
ethoxydiethylene glycol (meth)acrylate,
methoxytriethylene glycol (meth)acrylate,
methoxypolyethylene glycol (meth)acrylate,
phenoxypolyethylene glycol (meth)acrylate,
methoxypolypropylene glycol (meth)acrylate, and
2-hydroxy-3-phenoxypropyl acrylate; unsaturated amides such as N,N-dimethyl(meth)acrylamide, N-methylol(meth)acrylamide, and acryloylmorpholine; unsaturated carboxylic acids such as
(meth)acrylic acid, crotonic acid, cinnamic acid,
vinylbenzoic acid, maleic acid, fumaric acid and
itaconic acid; aromatic vinyl compounds such as styrene, α-methylstyrene, vinyltoluene, and methoxystyrene;
N-substituted maleimides such as methylmaleimide,
ethylmaleimide, isopropylmaleimide, cyclohexylmaleimide,
phenylmaleimide, benzylmaleimide, and naphthylmaleimide;
vinyl esters such as vinyl acetate, vinyl propionate,
vinyl butyrate, and vinyl benzoate; N-vinylamides such as N-vinylpyrrolidone, N-vinylcaprolactam, and N-vinylacetamide;
and allyl ethers such as allyl glycidyl ether and glycerol allyl ether.

When added, component (e) is used in an amount of preferably 0.1 to 80% by weight, more preferably 1 to 50% by weight based on the total weight of components (a), (b) and (c), as viewed from a balance of photocure rate and properties (e.g., dielectric constant) of a cured product.

(f) Solvent

If desired, the photocurable composition may further comprise (f) a solvent. Suitable solvents include hydrocarbons such as hexane, heptane, octane, isooctane, decane, toluene, xylene and mesitylene; alcohols such as methanol, ethanol, propanol, 2-propanol, butanol, 2-butanol, tert-butanol, and propylene glycol monomethyl ether; nitriles such as acetonitrile, propionitrile, benzonitrile, and 3-methoxypropionitrile; amides such as dimethylformamide, dimethylacetamide, and N-methylpyrrolidone; ethers such as diethyl ether, tetrahydrofuran, cyclopentyl methyl ether, 1,2-dimethoxyethane, and anisole; and esters such as ethyl acetate, isopropyl acetate, and propylene glycol monomethyl ether acetate, which may be used alone or in admixture. When a mixture of solvents is used, it is recommended to select mutually compatible solvents. Preference is given to those solvents in which components of the photocurable composition are soluble at room temperature.

When added, an appropriate amount of component (f) used is 0.01 to 10 times the total weight of components (a) to (e). When the composition containing the solvent is cured, the cured product is a gel.

Photocurable Composition

The photocurable composition takes a uniform liquid state at normal temperature. It is obtained by mixing essential components (a), (b), (c) and (d) and optional components (e) and (f). The mixing step may be carried out by any suitable methods, for example, shaking/mixing, agitation with an impeller or paddle, and mixing on a planetary centrifugal mixer or static mixer.

The photocurable composition remains stable at normal temperature under light-shielded conditions. A polymerization inhibitor may be added to the composition as long as the desired properties thereof including transparency and cure are maintained. Suitable polymerization inhibitors include hydroquinones such as hydroquinone monomethyl ether, hydroquinone mono-n-butyl ether,
hydroquinone monobenzyl ether,
hydroquinone monocyclohexyl ether, and 4-methoxy-1-naphthol;
hindered phenols such as 2,6-bis(tert-butyl)-4-methylphenol,
octadecyl-3-(3,5-di-tert-butyl-4-hydroxyphenyl)propionate,
isooctyl-3-(3,5-di-tert-butyl-4-hydroxyphenyl)propionate,
2,4-bis(n-octylthio)-6-(4-hydroxy-3,5-di-tert-butylanilino)-1,3,5-triazine,
3,5-di-tert-butyl-4-hydroxybenzylphosphonate diethyl ester,
and 6-tert-butyl-o-cresol; and semi-hindered phenols such as 6-tert-butyl-2,4-xylenol,
2,4,8,10-tetra-tert-butyl-6-[3-(3-methyl-4-hydroxy-5-tert-butylphenyl)propoxy]dibenzo[d,f][1,3,2]dioxaphosphepin,
2,4-dimethyl-6-(1-methylpentadecyl)phenol,
2,4-bis(octylthiomethyl)-o-cresol,
2,4-bis(dodecylthiomethyl)-o-cresol, 2-tert-butylphenol,
2,4-di-tert-butylphenol, 2-tert-pentylphenol, and
2,4-di-tert-pentylphenol, which may be used alone or in admixture.

When added, an appropriate amount of the polymerization inhibitor used is 0.001 to 2%, more preferably 0.05 to 1%, and even more preferably 0.01 to 0.1% by weight based on the total weight of components (a), (b), (c) and (e), as viewed from the aspects of maintaining cure reactivity, improving stability, and preventing coloring of the composition.

Cure of Photocurable Composition

The photocurable composition may be cured by light exposure. Since essential component (c) is a crosslinker, the cured product is available as a polymeric material having a network structure. Specifically, the composition is cured by irradiating light such as UV or visible light. While the wavelength of light to be irradiated may be selected depending on the type of a photo-polymerization initiator added, preference is given to UV light of wavelength 254 nm, 365 nm (i-line), 405 nm (h-line) or 436 nm (g-line) and visible light.

An appropriate dose of UV irradiated is about 10 to 1,000 mJ/cm$^2$. If necessary, light exposure may be followed by heating at 50 to 200° C. The heating time is preferably 10 to 500 minutes though arbitrary. To remove uncured low-molecular-weight fractions and the solvent, light exposure may be followed by post-treatment, typically solvent washing (e.g., solvents as component (f) or cyclohexane) or vacuum drying. A combination of such two or more post-treatments is acceptable.

Since the photocurable composition is liquid at normal temperature, it may be cured in a mold. Also the photocurable composition may be coated on a substrate to form a thin film before the thin film is cured. Alternatively, another transparent material, especially transparent polymeric material may be impregnated with the photocurable composition so that the material is swollen with the composition, before the composition is cured. Once a polymeric material having a crosslinked network structure is impregnated with the photocurable composition, the composition is cured, resulting in an interpenetrating polymer network (IPN) structure. Once a polymeric material having a chain structure is impregnated with the photocurable composition, the composition is cured, resulting in a semi-IPN structure.

Transparent Polymeric Material

In a further aspect, the invention provides a polymeric material which is a cured product obtained by curing the photocurable composition. The addition of component (a) contributes to improvements in electric properties such as dielectric constant. The addition of component (b) contributes to an improvement in compatibility between component (a) and other components, ensuring that the polymeric material is transparent and uniform. The addition of component (c) enables to adjust mechanical properties of the cured product. Since components (b), (c) and (e) are photo-polymerizable compounds, mechanical properties of the cured product may be determined by a proper choice of the type and amount (or mixing ratio) of these components.

EXAMPLE

Examples of the invention are given below by way of illustration and not by way of limitation. A weight average molecular weight (Mw) and number average molecular weight (Mn) are measured by gel permeation chromatography (GPC) versus polystyrene standards.

Synthesis Example 1

Synthesis of Cyanoethylsilsesquioxane

A 100-ml four-neck round bottom flask equipped with a stirrer, thermometer, reflux condenser and dropping funnel was purged with nitrogen while nitrogen was passed to the top of the reflux condenser which was open to the ambient air, to shut off air and moisture. The flask was charged with 17.38 g (80.0 mmol) of 2-cyanoethyltriethoxysilane, 60.2 g of acetone, 7.20 g (400 mmol) of deionized water, and 184 mg (4.00 mmol) of formic acid, which were stirred at room temperature for 2 hours. While the progress of reaction was monitored by GPC, the reaction was continued at the solvent reflux temperature for 29 hours. The resulting colorless clear solution was subjected to atmospheric distillation, whereby the solvent was distilled off and the solution was concentrated to an approximately half volume. A product corresponding to the main peak had a Mw of 1,373 and a Mn of 1,325 and hence, a dispersity (Mw/Mn) of 1.04. The concentrate was further concentrated under reduced pressure. The residue was vacuum dried at 80° C., yielding a white solid. FIG. 1 shows the IR spectrum of this solid. There were observed a peak of stretching vibration of a cyano group at 2250 cm$^{-1}$ and a peak of stretching vibration of a Si—O bond at 1000-1100 cm$^{-1}$, demonstrating that the desired silsesquioxane was obtained. Also a broad peak assigned to silanol was observed near 3400 cm$^{-1}$. By differential thermogravimetric analysis of the white solid, its silanol content was determined. Specifically, the white solid was heated from 30° C. at a rate of 10° C./min. The silanol content was computed based on a percent weight loss from 160° C. to 280° C. A silanol content of 14 mol % at maximum based on the overall silicon atoms was estimated.

Synthesis Example 2

Synthesis of Trimethylsilylated Cyanoethylsilsesquioxane

Figure 2:
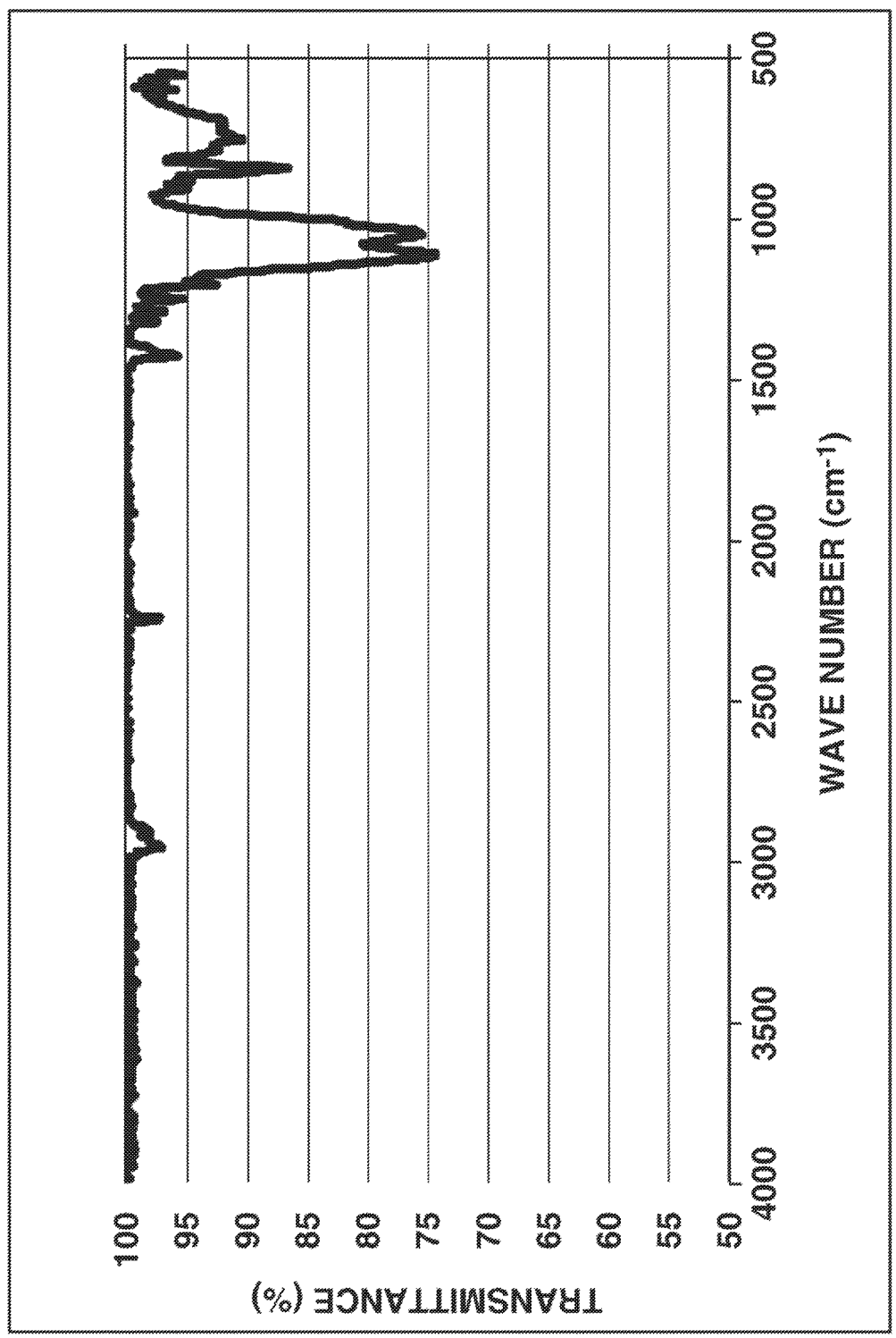
FIG. 2 is a diagram showing IR spectrum of a silsesquioxane in Synthesis Example 2.
Figure 3:
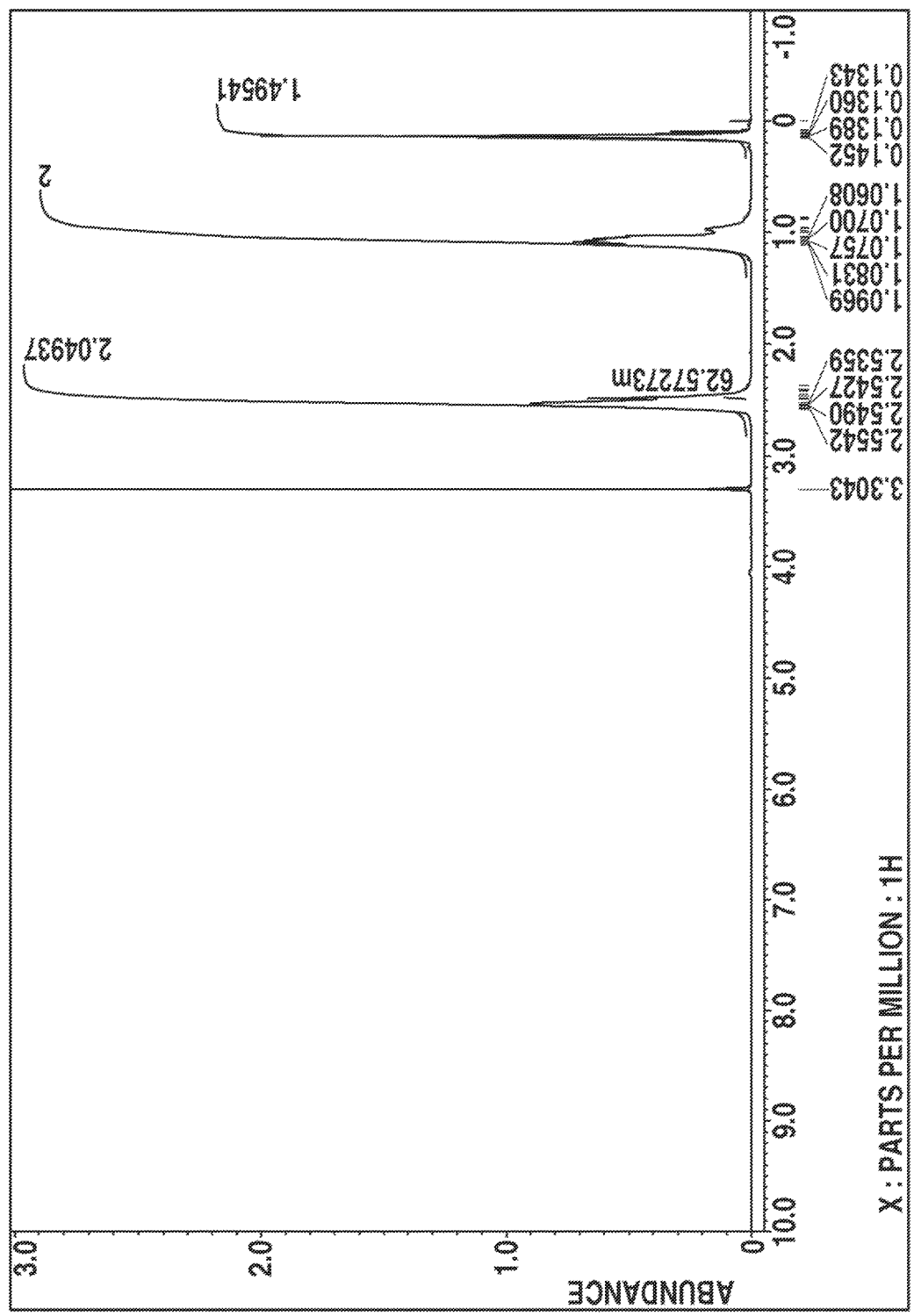
FIG. 3 is a diagram showing $^1$H-NMR spectrum (in deuterated dimethyl sulfoxide) of the silsesquioxane in Synthesis Example 2.

A 100-ml four-neck round bottom flask equipped with a stirrer, thermometer, reflux condenser and dropping funnel was purged with nitrogen while nitrogen was passed to the top of the reflux condenser which was open to the ambient air, to shut off air and moisture. The flask was charged with 21.73 g (100 mmol) of 2-cyanoethyltriethoxysilane, 20 g of acetone, and 1.01 g (10.0 mmol) of triethylamine. With stirring, the mixture was heated at a temperature of 50° C. Then 5.40 g (300 mmol) of deionized water was added to the mixture, which was stirred at 50° C. for 5 hours. Then 2.08 g (20.0 mmol) of trimethylmethoxysilane was added to the mixture, which was stirred at 50° C. for a further 5 hours. Gas chromatography (GC) analysis indicated a conversion of 100% for 2-cyanoethyltriethoxysilane and a conversion of 83% for trimethylmethoxysilane. The reaction mixture was concentrated under reduced pressure. The residue was vacuum dried at 80° C., yielding a white solid. On GPC analysis of the solid, a product corresponding to the main peak had a Mw of 2,968 and a Mn of 2,323 and hence, a dispersity (Mw/Mn) of 1.28. FIGS. 2 and 3 show the IR and $^1$H-NMR (in deuterated dimethyl sulfoxide) spectra of this solid, respectively. In the IR spectrum, there were observed a peak of stretching vibration of a cyano group at 2250 cm$^{-1}$ and a peak of stretching vibration of a Si—O bond at 1000-1100 cm$^{-1}$, whereas a broad peak assigned to silanol, which would appear near 3400 cm$^{-1}$, was not observed. These analysis results demonstrated that the desired silsesquioxane was obtained. The white solid was heated from 30° C. at a rate of 10° C./min., and a silanol content was computed based on a percent weight loss from 160° C. to 280° C. A silanol content of 9 mol % at maximum based on the overall silicon atoms was estimated.

Synthesis Example 3

Synthesis of a Mixture of Acrylic-Containing Silsesquioxanes

Figure 4:
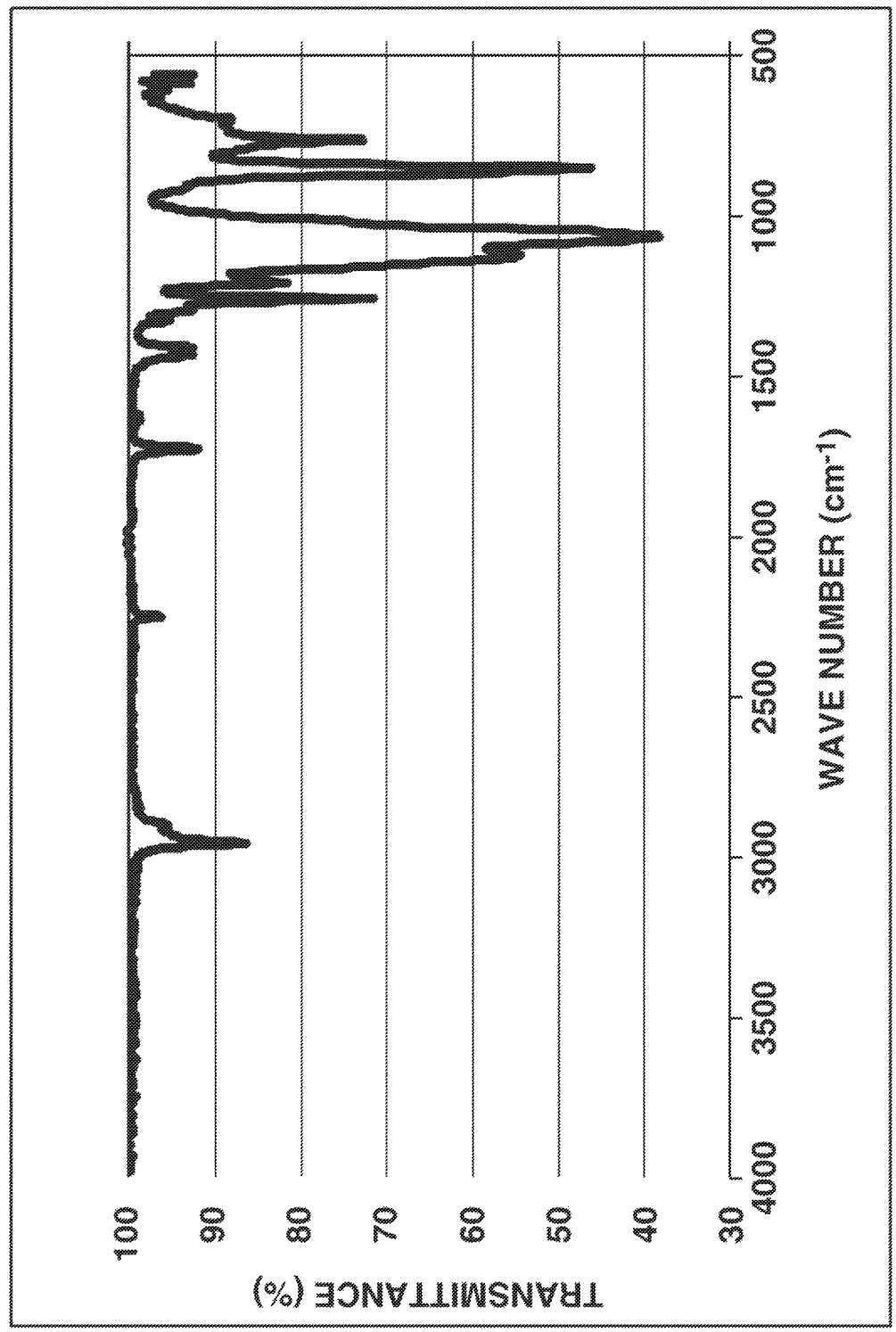
FIG. 4 is a diagram showing IR spectrum of a silsesquioxane in Synthesis Example 3.
Figure 5:
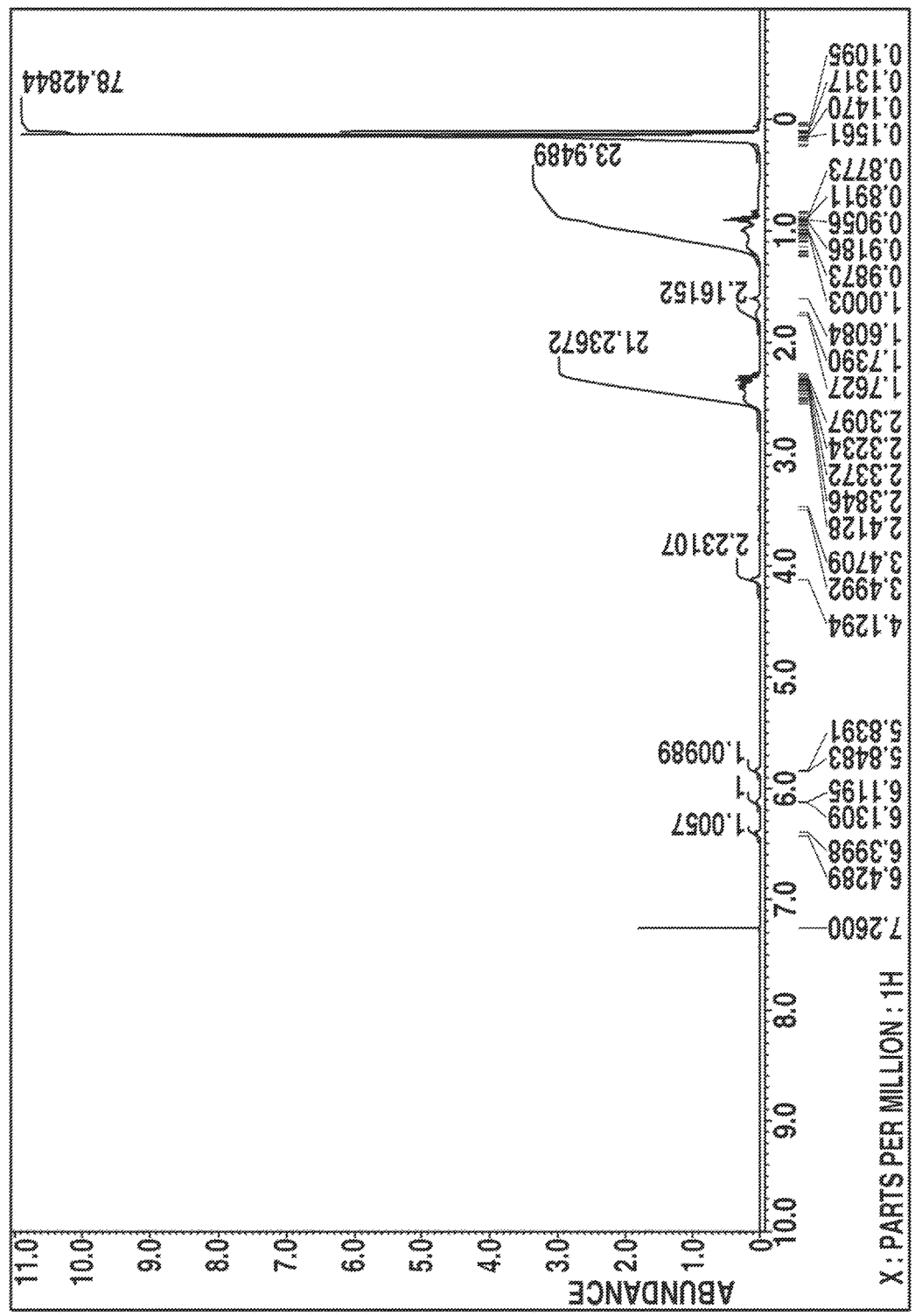
FIG. 5 is a diagram showing $^1$H-NMR spectrum (in deuterated chloroform) of the silsesquioxane in Synthesis Example 3.

A 100-ml four-neck round bottom flask equipped with a stirrer, thermometer, reflux condenser and dropping funnel was purged with nitrogen while nitrogen was passed to the top of the reflux condenser which was open to the ambient air, to shut off air and moisture. The flask was charged with 34.77 g (160.0 mmol) of 2-cyanoethyltriethoxysilane, 3.75 g (16.0 mmol) of 3-acryloyloxypropyltrimethoxysilane, 17.6 g of acetone, and 0.89 g (8.8 mmol) of triethylamine. With stirring, the mixture was heated at a temperature of 50° C. Then 9.50 g (528 mmol) of deionized water was added to the mixture, which was stirred at 50° C. for 5 hours. Then 16.67 g (160.0 mmol) of trimethylmethoxysilane was added to the mixture, which was stirred at 50° C. for a further 5 hours. GC analysis indicated a conversion of 100% for both 2-cyanoethyltriethoxysilane and 3-acryloyloxypropyltrimethoxysilane and a conversion of 82% for trimethylmethoxysilane. The reaction mixture was concentrated under reduced pressure. The residue was vacuum dried at 100° C., yielding a colorless transparent oily matter. On GPC analysis of the oily matter, a product corresponding to the main peak had a Mw of 1,656 and a Mn of 1,428 and hence, a dispersity (Mw/Mn) of 1.16. FIGS. 4 and 5 show the IR and $^1$H-NMR (in deuterated chloroform) spectra of this oily matter, respectively. These analysis results demonstrated that the desired silsesquioxane was obtained.

Synthesis Example 4

Synthesis of a Mixture of Acid Anhydride-Containing Silsesquioxanes

Figure 6:
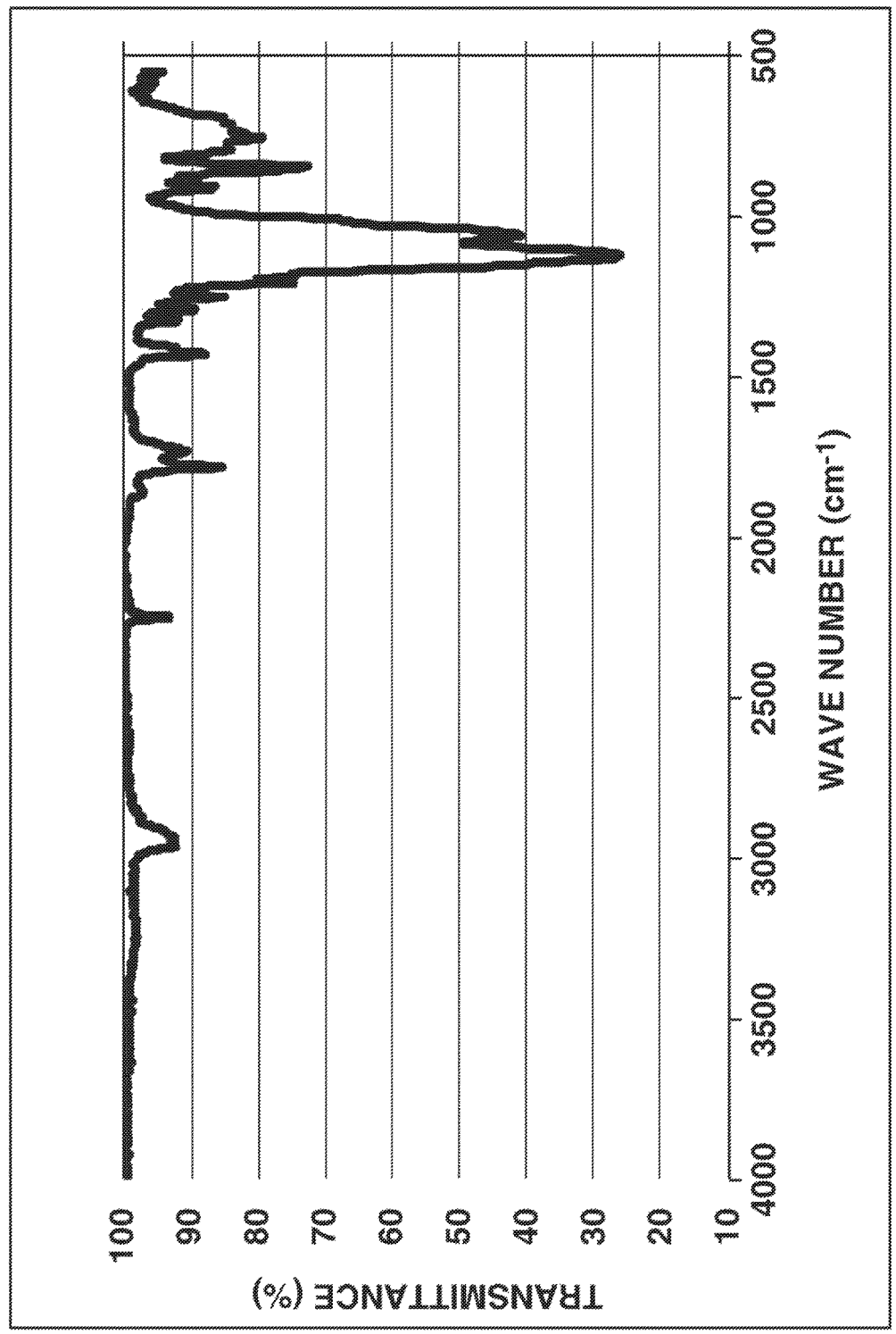
FIG. 6 is a diagram showing IR spectrum of a silsesquioxane in Synthesis Example 4.
Figure 7:
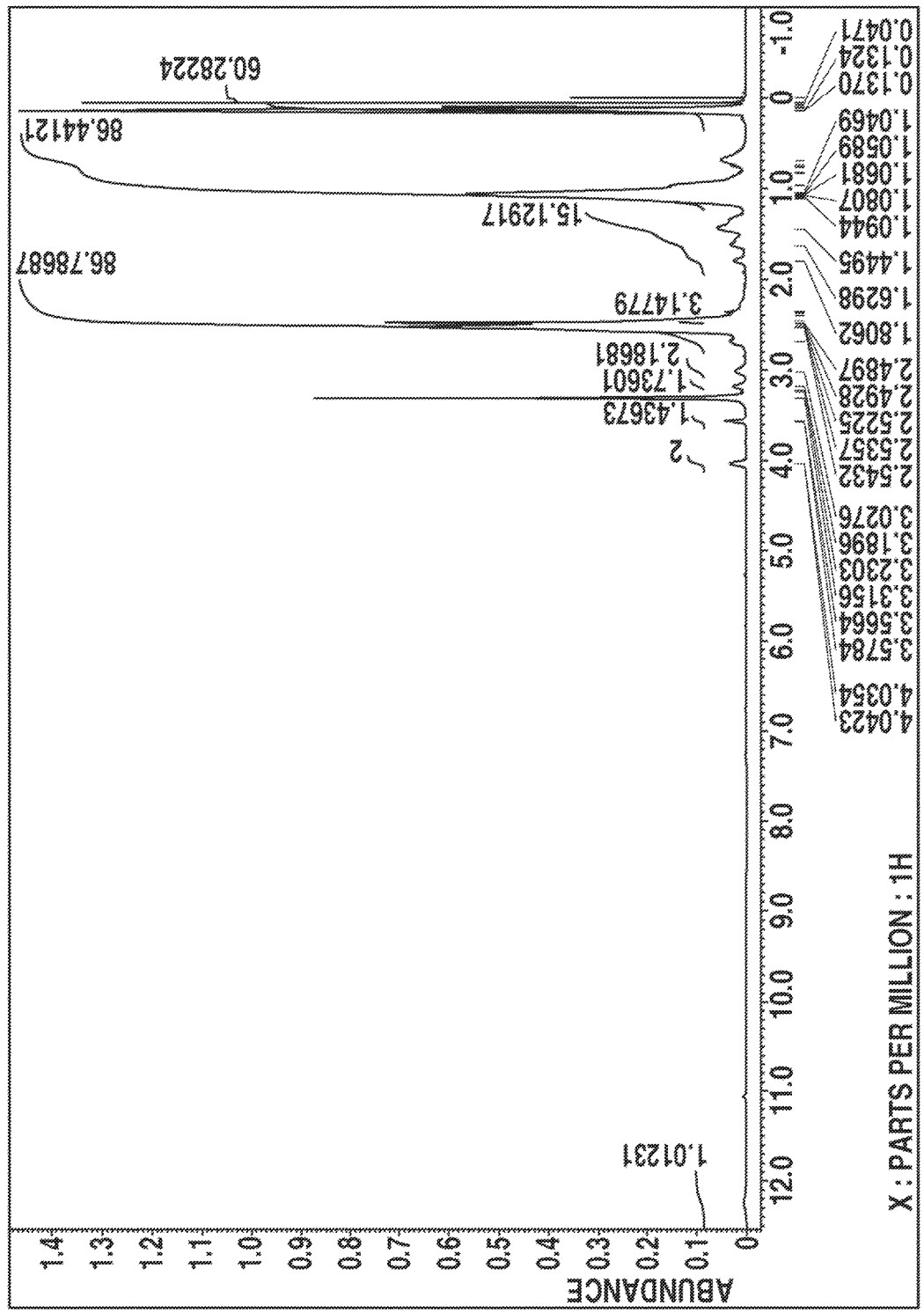
FIG. 7 is a diagram showing $^1$H-NMR spectrum (in deuterated dimethyl sulfoxide) of the silsesquioxane in Synthesis Example 4.

A 100-ml four-neck round bottom flask equipped with a stirrer, thermometer, reflux condenser and dropping funnel was purged with nitrogen while nitrogen was passed to the top of the reflux condenser which was open to the ambient air, to shut off air and moisture. The flask was charged with 17.38 g (80.0 mmol) of 2-cyanoethyltriethoxysilane, 2.10 g (8.0 mmol) of 3-trimethoxysilylpropylsuccinic anhydride, 8.8 g of acetone, and 0.45 g (4.4 mmol) of triethylamine. With stirring, the mixture was heated at a temperature of 50° C. Then 4.75 g (264 mmol) of deionized water was added to the mixture, which was stirred at 50° C. for 16 hours. Then 3.33 g (32.0 mmol) of trimethylmethoxysilane was added to the mixture, which was stirred at 50° C. for a further 12 hours. GC analysis indicated a conversion of 100% for both 2-cyanoethyltriethoxysilane and 3-trimethoxysilylpropylsuccinic anhydride and a conversion of 65% for trimethylmethoxysilane. The reaction mixture was concentrated under reduced pressure. The residue was vacuum dried at 150° C., yielding a pale yellow transparent solid. On GPC analysis of the solid, a product corresponding to the main peak had a Mw of 1,735 and a Mn of 1,505 and hence, a dispersity (Mw/Mn) of 1.15. FIGS. 6 and 7 show the IR and $^1$H-NMR (in deuterated dimethyl sulfoxide) spectra of this solid, respectively. These analysis results demonstrated that the desired silsesquioxane was obtained. It was found that 36% of the anhydride was ring-opened, and 63% of carboxyl groups resulting from ring-opening formed an ethyl ester.

Synthesis Example 5

Synthesis of Methacrylic-Containing Silsesquioxane

Figure 8:
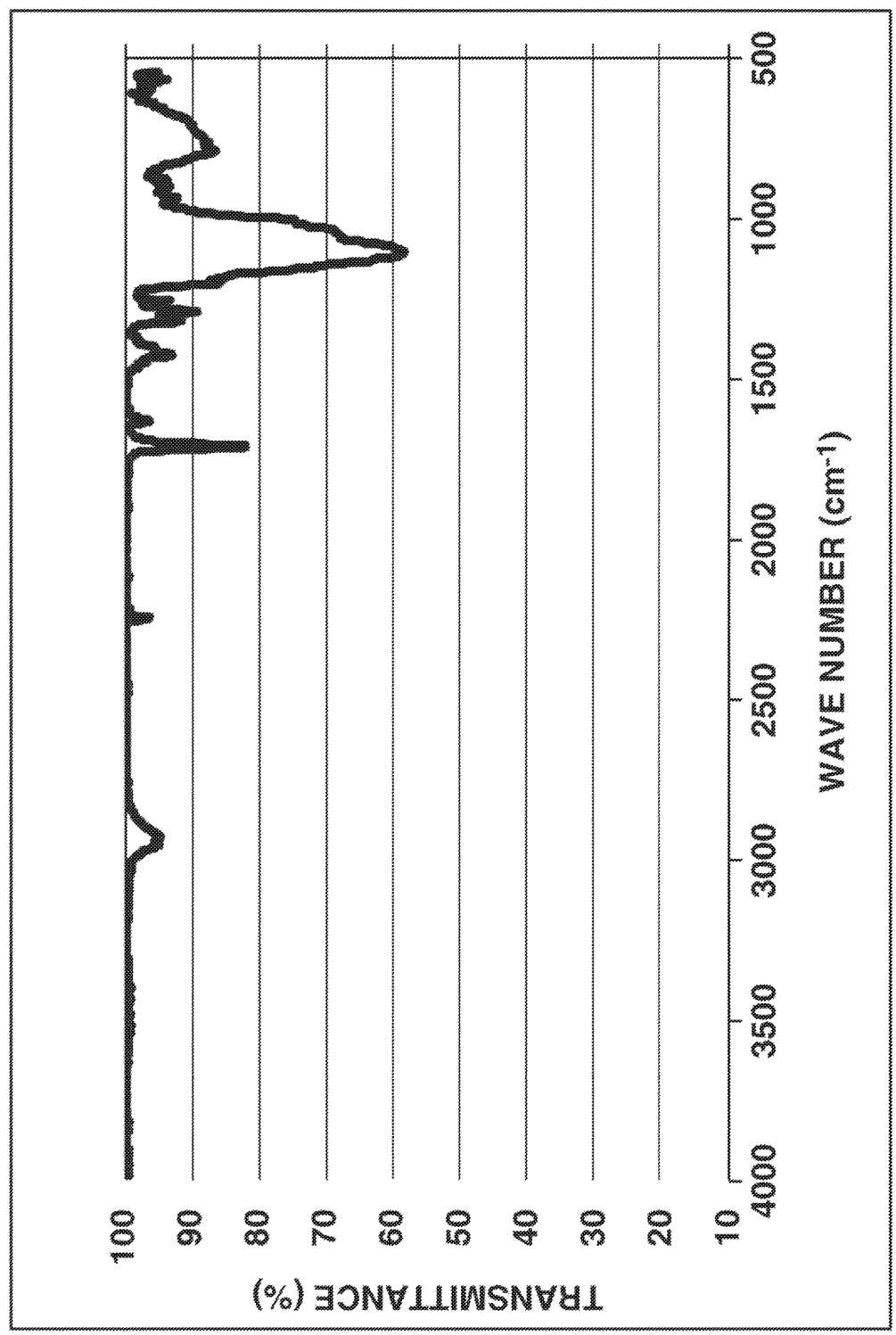
FIG. 8 is a diagram showing IR spectrum of a silsesquioxane in Synthesis Example 5.
Figure 9:
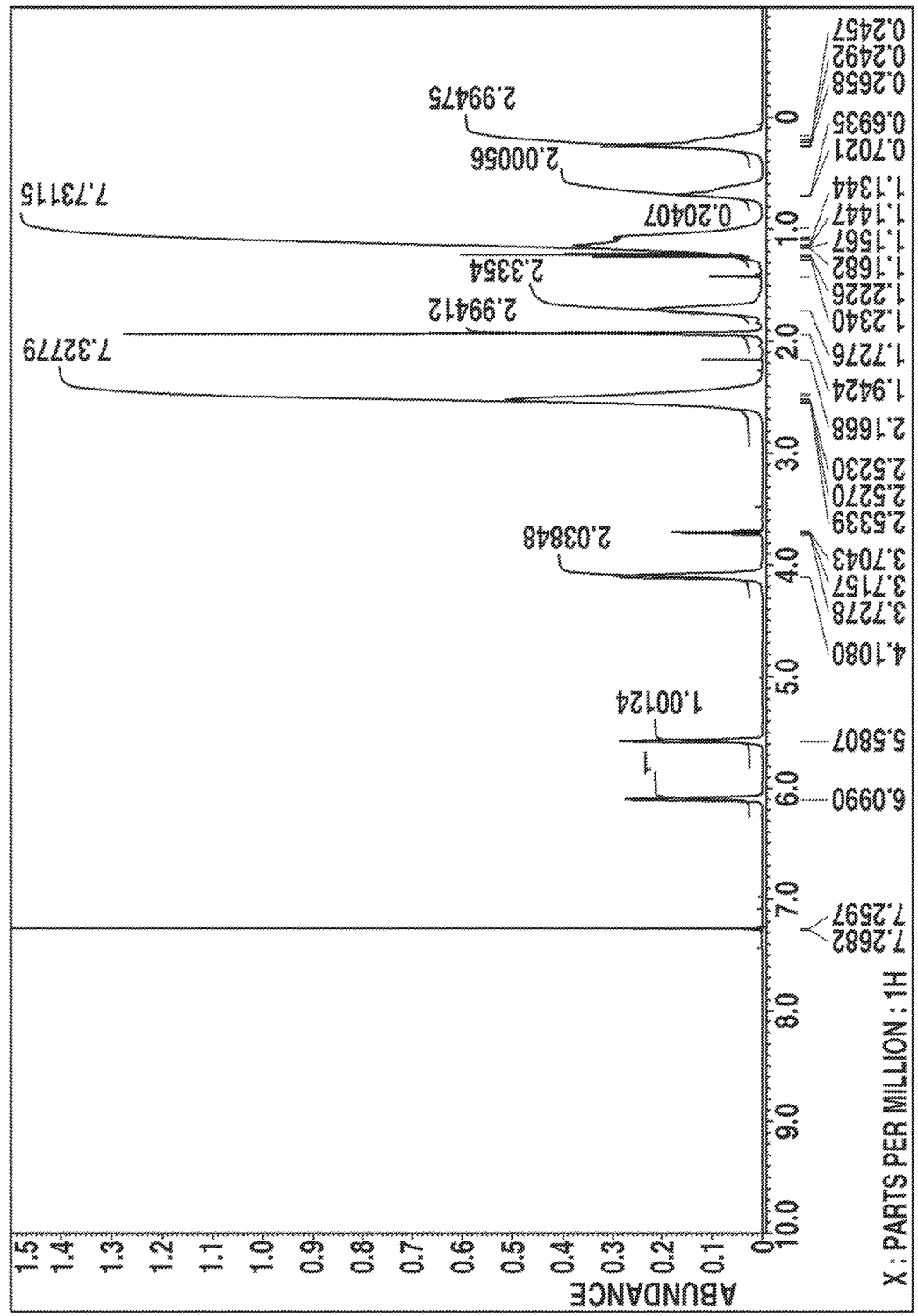
FIG. 9 is a diagram showing $^1$H-NMR spectrum (in deuterated chloroform) of the silsesquioxane in Synthesis Example 5.

A 100-ml four-neck round bottom flask equipped with a stirrer, thermometer, reflux condenser and dropping funnel was purged with nitrogen while nitrogen was passed to the top of the reflux condenser which was open to the ambient air, to shut off air and moisture. The flask was charged with 30.42 g (140.0 mmol) of 2-cyanoethyltriethoxysilane, 9.76 g (42.0 mmol) of 3-methacryloyloxypropylmethyldimethoxysilane, 18.2 g of acetone, and 0.92 g (9.1 mmol) of triethylamine. With stirring, the mixture was heated at a temperature of 50° C. Then 9.83 g (546 mmol) of deionized water was added to the mixture, which was stirred at 50° C. for 5 hours. GC analysis indicated a conversion of 100% for both 2-cyanoethyltriethoxysilane and 3-methacryloyloxypropylmethyldimethoxysilane. The reaction mixture was concentrated under reduced pressure. The residue was vacuum dried at 80° C., yielding a colorless transparent oily matter. On GPC analysis of the oily matter, a product corresponding to the main peak had a Mw of 3,713 and a Mn of 2,463 and hence, a dispersity (Mw/Mn) of 1.51. FIGS. 8 and 9 show the IR and $^1$H-NMR (in deuterated chloroform) spectra of this oily matter, respectively. These analysis results demonstrated that the desired silsesquioxane was obtained.

Synthesis Example 6

Synthesis of Methacrylic-Containing Silsesquioxane

Figure 10:
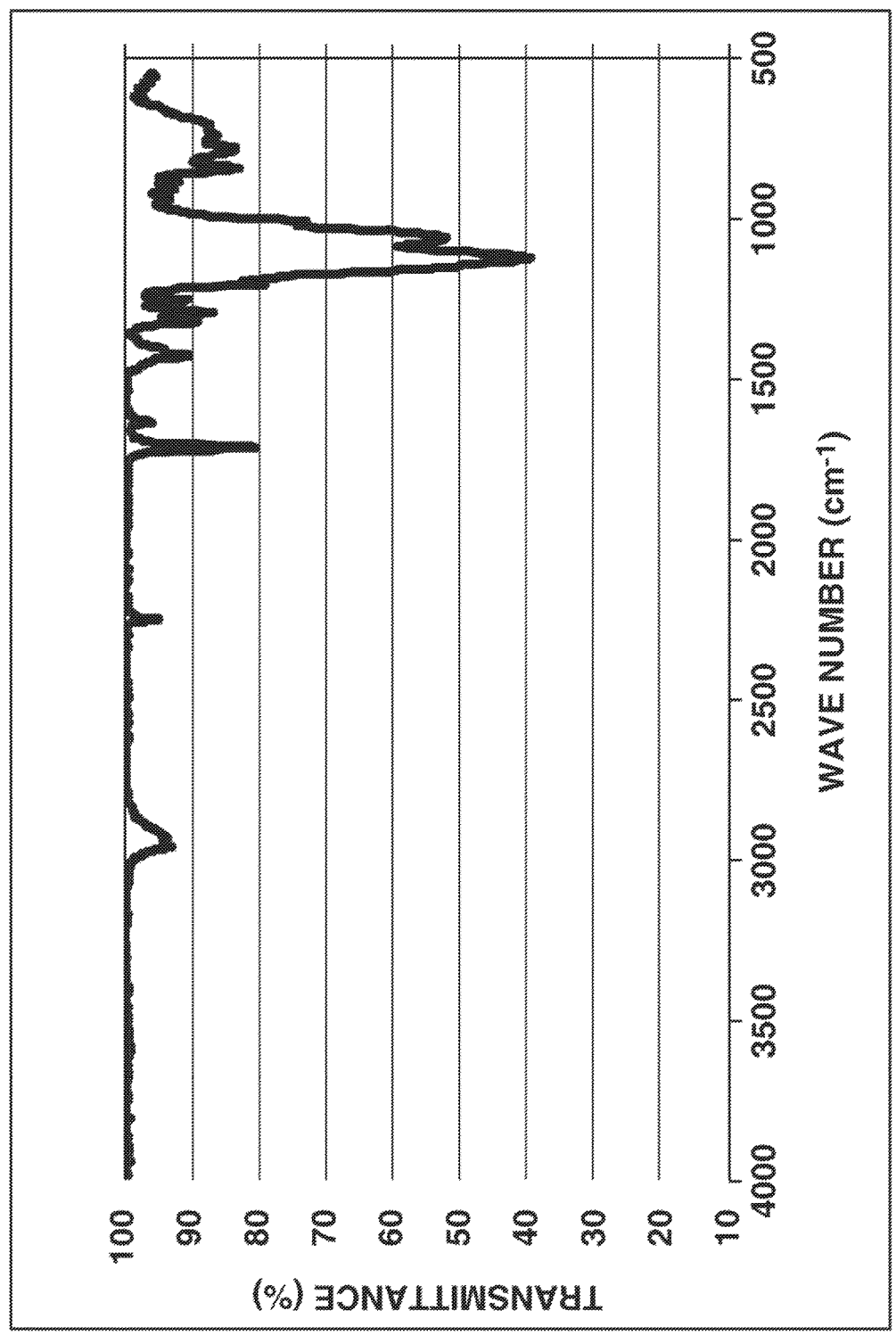
FIG. 10 is a diagram showing IR spectrum of a silsesquioxane in Synthesis Example 6.

A 100-ml four-neck round bottom flask equipped with a stirrer, thermometer, reflux condenser and dropping funnel was purged with nitrogen while nitrogen was passed to the top of the reflux condenser which was open to the ambient air, to shut off air and moisture. The flask was charged with 21.73 g (100.0 mmol) of 2-cyanoethyltriethoxysilane, 15.0 g of acetone, and 0.51 g (5.0 mmol) of triethylamine. With stirring, the mixture was heated at a temperature of 50° C. Then 5.40 g (300 mmol) of deionized water was added to the mixture, which was stirred at 50° C. for 5 hours. Then 4.33 g (20 mmol) of 3-methacryloyloxypropyldimethylmethoxysilane was added to the mixture, which was stirred at 50° C. for 8 hours. GC analysis indicated a conversion of 100% for both 2-cyanoethyltriethoxysilane and 3-methacryloyloxypropyldimethylmethoxysilane. The reaction mixture was concentrated under reduced pressure. The residue was vacuum dried at 80° C., yielding a colorless, transparent, viscous oily matter. On GPC analysis of the oily matter, a product corresponding to the main peak had a Mw of 2,272 and a Mn of 1,919 and hence, a dispersity (Mw/Mn) of 1.18. FIGS. 10 and 11 show the IR and $^1$H-NMR (in deuterated chloroform) spectra of this oily matter, respectively. These analysis results demonstrated that the desired silsesquioxane was obtained.

Examples 1-1 to 1-2 & Comparative Examples 1-1 to 1-3

A photocurable composition was prepared by mixing the silsesquioxane obtained in Synthesis Example 1 as component (a), 2-cyanoethyl acrylate (CEA) as component (b), 1,4-butanediol diacrylate (BDA) as component (c), 2-hydroxy-2-methyl-1-phenylpropan-1-one (HMP) as component (d), ethyl acrylate (EA) as component (e), and 3-methoxypropionitrile (MPN) or toluene (TOL) as component (f) in accordance with the formulation shown in Table 1. In Comparative Example 1-3, a uniform composition was not obtained, with no cured product obtained. Each composition was fed in a mold of quartz glass of 1 mm deep, and cured in a nitrogen atmosphere by irradiating UV light centering at wavelength 365 nm. The cured product was vacuum dried at 80° C. into a rubbery product, designated E1-1, E1-2, C1-1, or C1-2.

TABLE 1

(unit: g)

| Compound | Component (a) Synthesis Example 1 | (b) CEA | (c) BDA | (d) HMP | (e) EA | (f) MPN | (f) TOL | Appearance of composition |
|---|---|---|---|---|---|---|---|---|
| Example 1-1 | 10 | 40 | 0.92 | 0.53 | | 50 | | transparent |
| Example 1-2 | 10 | 40 | 2.07 | 1.19 | 40 | 90 | | transparent |
| Comparative Example 1-1 | | 50 | 1.15 | 0.66 | | 50 | | transparent |
| Comparative Example 1-2 | | 40 | 2.07 | 1.19 | 40 | 40 | 40 | transparent |
| Comparative Example 1-3 | 10 | | 1.15 | 0.66 | 40 | | 50 | some insoluble |

The outer appearance and dielectric constant (relative permittivity, 1 kHz, 25° C.) of cured products E1-1, E1-2, C1-1, and C1-2 are shown in Table 2.

TABLE 2

| | Cured product | Appearance | Dielectric constant |
|---|---|---|---|
| Example 1-1 | E1-1 | transparent | 12.3 |
| Example 1-2 | E1-2 | transparent | 9.0 |
| Comparative Example 1-1 | C1-1 | transparent | 9.4 |
| Comparative Example 1-2 | C1-2 | transparent | 6.6 |

Examples 2-1 to 2-5 & Comparative Example 2-1

A photocurable composition was prepared by mixing the silsesquioxane obtained in Synthesis Examples 2 to 6 as component (a), 2-cyanoethyl acrylate (CEA) as component (b), 1,4-butanediol diacrylate (BDA) as component (c), and 2-hydroxy-2-methyl-1-phenylpropan-1-one (HMP) as component (d) in accordance with the formulation shown in Table 3. Each composition was fed in a mold of quartz glass of 1 mm deep, and cured in a nitrogen atmosphere by irradiating UV light centering at wavelength 365 nm. The cured product was vacuum dried at 80° C. into a flexible product, designated E2-1 to E2-5 or C2-1.

The outer appearance and dielectric constant (1 kHz, 25° C.) of cured products E2-1 to E2-5 and C2-1 are shown in Table 4.

TABLE 4

| | Cured product | Appearance | Dielectric constant |
|---|---|---|---|
| Example 2-1 | E2-1 | transparent | 12.2 |
| Example 2-2 | E2-2 | transparent | 11.7 |
| Example 2-3 | E2-3 | transparent | 13.0 |
| Example 2-4 | E2-4 | transparent | 10.9 |
| Example 2-5 | E2-5 | transparent | 13.5 |
| Comparative Example 2-1 | C2-1 | transparent | 9.7 |

Example 3-1 & Comparative Example 3-1

A photocurable composition was prepared by mixing the silsesquioxane obtained in Synthesis Example 3 as component (a), 2-cyanoethyl methacrylate (CEMA) as component (b), 1,4-butanediol dimethacrylate (BDMA) as component (c), and 2-hydroxy-2-methyl-1-phenylpropan-1-one (HMP) as component (d) in accordance with the formulation shown in Table 5. Each composition was fed in a mold of quartz glass of 1 mm deep, and cured in a nitrogen atmosphere by irradiating UV light centering at wavelength 365 nm. The cured product was vacuum dried at 80° C. into a product, designated E3-1 or C3-1.

TABLE 3

(unit: g)

| Compound | (a) Synthesis Example 2 | (a) Synthesis Example 3 | (a) Synthesis Example 4 | (a) Synthesis Example 5 | (a) Synthesis Example 6 | (b) CEA | (c) BDA | (d) HMP | Appearance of composition |
|---|---|---|---|---|---|---|---|---|---|
| Example 2-1 | 10 | | | | | 40 | 0.92 | 0.53 | transparent |
| Example 2-2 | | 10 | | | | 40 | 0.92 | 0.53 | transparent |
| Example 2-3 | | | 10 | | | 40 | 0.92 | 0.53 | transparent |
| Example 2-4 | | | | 10 | | 40 | 0.92 | 0.53 | transparent |
| Example 2-5 | | | | | 10 | 40 | 0.92 | 0.53 | transparent |
| Comparative Example 2-1 | | | | | | 50 | 1.15 | 0.66 | transparent |

TABLE 5

| | Component | | | | |
|---|---|---|---|---|---|
| Compound | (a) Synthesis Example 3 | (b) CEMA | (c) BDMA | (d) HMP | Appearance of composition |
| Example 3-1 | 10 | 40 | 0.80 | 0.47 | transparent |
| Comparative Example 3-1 | | 50 | 1.00 | 0.59 | transparent |

(unit: g)

The outer appearance and dielectric constant (1 kHz, 25° C.) of cured products E3-1 and C3-1 are shown in Table 6.

TABLE 6

| | Cured product | Appearance | Dielectric constant |
|---|---|---|---|
| Example 3-1 | E3-1 | transparent | 6.8 |
| Comparative Example 3-1 | C3-1 | transparent | 5.9 |

Examples 4-1 to 4-2 & Comparative Example 4-1

A photocurable composition of Example 4-1, 4-2 or Comparative Example 4-1 was prepared by mixing the silsesquioxane obtained in Synthesis Example 1 or 2 as component (a), CEA as component (b), BDA as component (c), and HMP as component (d) in accordance with the formulation shown in Table 7. Separately, a composition was prepared by mixing 50 g of CEA, 1.15 g of BDA, 0.66 g of HMP, and 50 g of MPN. This composition was photo-cured by the same procedure as in Example 1. The cured product was washed twice by immersing it in a 1/1 mixture of cyclohexane and toluene for 3 hours, and then vacuum dried at 80° C. The resulting rubbery transparent cured product A was immersed in the composition of Example 4-1, 4-2 or Comparative Example 4-1 at room temperature for 3 hours, whereupon cured product A was swollen therewith. The extra of the composition of Example 4-1, 4-2 or Comparative Example 4-1 on the surface of swollen product A was wiped off, whereupon the composition was cured in a nitrogen atmosphere by irradiating UV light centering at wavelength 365 nm. The product was vacuum dried at 80° C., yielding a rubbery product, designated E4-1, E4-2 or C4-1. It was believed that these cured products had an TPN structure.

TABLE 7

| | Component | | | | | |
|---|---|---|---|---|---|---|
| Compound | (a) Synthesis Example 1 | (a) Synthesis Example 2 | (b) CEA | (c) BDA | (d) HMP | Appearance of composition |
| Example 4-1 | 20 | | 80 | 0.013 | 0.011 | transparent |
| Example 4-2 | | 20 | 80 | 0.013 | 0.011 | transparent |
| Comparative Example 4-1 | | | 100 | 0.016 | 0.013 | transparent |

(unit: g)

The outer appearance and dielectric constant (1 kHz, 25° C.) of cured products E4-1, E4-2 and C4-1 are shown in Table 8.

TABLE 8

| | Cured product | Appearance | Dielectric constant |
|---|---|---|---|
| Example 4-1 | E4-1 | transparent | 13.1 |
| Example 4-2 | E4-2 | transparent | 15.0 |
| Comparative Example 4-1 | C4-1 | transparent | 9.9 |

Example 5-1 & Comparative Example 5-1

A photocurable composition of Example 5-1 or Comparative Example 5-1 was prepared by mixing the silsesquioxane obtained in Synthesis Example 1 as component (a), CEA as component (b), BDA as component (c), and HMP as component (d) in accordance with the formulation shown in Table 9. Separately, a composition was prepared by mixing 1.43 g of BDA, 0.82 g of HMP, 50 g of EA, and 50 g of TOL. This composition was photo-cured by the same procedure as in Example 1. The cured product was washed twice by immersing it in a 1/1 mixture of cyclohexane and toluene for 3 hours, and then vacuum dried at 80° C. The resulting rubbery transparent cured product B was immersed in the composition of Example 5-1 or Comparative Example 5-1 at room temperature for 3 hours, whereupon product B was swollen therewith. The extra of the composition of Example 5-1 or Comparative Example 5-1 on the surface of swollen product B was wiped off, whereupon the composition was cured in a nitrogen atmosphere by irradiating UV light centering at wavelength 365 nm. The product was vacuum dried at 80° C., yielding a rubbery product, designated E5-1 or C5-1. It was believed that these cured products had an IPN structure.

TABLE 9

| | Component | | | | |
|---|---|---|---|---|---|
| Compound | (a) Synthesis Example 1 | (b) CEA | (c) BDA | (d) HMP | Appearance of composition |
| Example 5-1 | 20 | 80 | 0.013 | 0.011 | transparent |
| Comparative Example 5-1 | | 100 | 0.016 | 0.013 | transparent |

(unit: g)

The outer appearance and dielectric constant (1 kHz, 25° C.) of cured products E5-1 and C5-1 are shown in Table 10.

TABLE 10

| | Cured product | Appearance | Dielectric constant |
|---|---|---|---|
| Example 5-1 | E5-1 | transparent | 10.1 |
| Comparative Example 5-1 | C5-1 | transparent | 8.1 |

A cured product obtained by curing the photocurable composition is a polymeric material having a high dielectric constant (or relative permittivity). Since electrical and mechanical properties of the polymeric material may be adjusted by properly selecting the type and amount of constituent monomers, the polymeric material finds use as the material for actuators and sensors and the insulating film for organic transistors.

Japanese Patent Application No. 2015-100113 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A photocurable composition comprising
   (a) a silsesquioxane having a cyano group,
   (b) an ethylenically unsaturated monofunctional monomer having a cyano group,
   (c) 0.001 to 3.975% by weight, based on the total weight of components (a), (b), and (c), of an ethylenically unsaturated polyfunctional monomer, and
   (d) a photo-polymerization initiator,
   wherein
   component (a) is a silsesquioxane having the general formula (1):

$(NC-A-SiO_{3/2})_m(NC-A-SiRO_{2/2})_n(NC-A-SiR_2O_{1/2})_p$
   $(G-B-SiO_{3/2})_q(G-B-SiR^1O_{2/2})_r(G-B-SiR^1_2O_{1/2})_s$ (1)

wherein A and B are each independently a $C_1$-$C_{10}$ divalent hydrocarbon group, R and $R^1$ are each independently a $C_1$-$C_6$ monovalent hydrocarbon group, $C_1$-$C_3$ alkoxy group, hydroxyl group or $C_3$-$C_{20}$ triorganosiloxy group, G is a $C_1$-$C_8$ alkyl group or $C_1$-$C_3$ alkoxy group, in which one or two hydrogen atoms are substituted by a monovalent substituent selected from the group consisting of a carboxyl group, $C_2$-$C_4$ ester group, hydroxyl group, $C_2$-$C_6$ epoxide-containing group, $C_3$-$C_6$ α,β-unsaturated acyloxy group, $C_2$-$C_3$ alkenyl group, and $C_4$-$C_8$ acid anhydride-containing group, m, n, p, q, r and s are each independently an integer of 0 to 200, the sum m+q is at least 4, the sum m+n+p is 4 to 200, and the sum m+n+p+q+r+s is 4 to 200, and
   component (b) is an α,β-unsaturated carboxylic acid ester having a cyano group or is an α,β-unsaturated nitrile, and
   with the proviso that the composition does not comprise (e) an ethylenically unsaturated monofunctional monomer free of a cyano group.

2. The photocurable composition of claim 1 wherein said α,β-unsaturated carboxylic acid ester having a cyano group is at least one member selected from the group consisting of 2-cyanoethyl (meth)acrylate, 3-cyanopropyl (meth)acrylate, and 4-cyanophenyl (meth)acrylate.

3. The photocurable composition of claim 1 wherein component (c) is an α,β-unsaturated carboxylic acid ester of a polyhydric alcohol.

4. The photocurable composition of claim 1, further comprising
   (f) a solvent.

5. A cured product of a photocurable composition comprising
   (a) a silsesquioxane having the general formula (1):

$(NC-A-SiO_{3/2})_m(NC-A-SiRO_{2/2})_n(NC-A-SiR_2O_{1/2})_p$
   $(G-B-SiO_{3/2})_q(G-B-SiR^1O_{2/2})_r(G-B-SiR^1_2O_{1/2})_s$ (1)

wherein A and B are each independently a $C_1$-$C_{10}$ divalent hydrocarbon group, R and $R^1$ are each independently a $C_1$-$C_6$ monovalent hydrocarbon group, $C_1$-$C_3$ alkoxy group, hydroxyl group or $C_3$-$C_{20}$ triorganosiloxy group, G is a $C_1$-$C_8$ alkyl group or $C_1$-$C_3$ alkoxy group, in which one or two hydrogen atoms are substituted by a monovalent substituent selected from the group consisting of a carboxyl group, $C_2$-$C_4$ ester group, hydroxyl group, $C_2$-$C_6$ epoxide-containing group, $C_3$-$C_6$ α,β-unsaturated acyloxy group, $C_2$-$C_3$ alkenyl group, and $C_4$-$C_8$ acid anhydride-containing group, m, n, p, q, r and s are each independently an integer of 0 to 200, the sum m+q is at least 4, the sum m+n+p is 4 to 200, and the sum m+n+p+q+r+s is 4 to 200,
   (b) an α,β-unsaturated carboxylic acid ester having a cyano group or an α,β-unsaturated nitrile,
   (c) 0.001 to 3.975% by weight, based on the total weight of components (a), (b), and (c), of an ethylenically unsaturated polyfunctional monomer, and
   (d) a photo-polymerization initiator,
   with the proviso that the composition does not comprise (e) an ethylenically unsaturated monofunctional monomer free of a cyano group.

6. A polymeric material which is obtained by curing a mixture of
   a polymer of chain or network structure and
   a photocurable composition comprising
   (a) a silsesquioxane having the general formula (1):

$(NC-A-SiO_{3/2})_m(NC-A-SiRO_{2/2})_n(NC-A-SiR_2O_{1/2})_p$
   $(G-B-SiO_{3/2})_q(G-B-SiR^1O_{2/2})_r(G-B-SiR^1_2O_{1/2})_s$ (1)

wherein A and B are each independently a $C_1$-$C_{10}$ divalent hydrocarbon group, R and $R^1$ are each independently a $C_1$-$C_6$ monovalent hydrocarbon group, $C_1$-$C_3$ alkoxy group, hydroxyl group or $C_3$-$C_{20}$ triorganosiloxy group, G is a $C_1$-$C_8$ alkyl group or $C_1$-$C_3$ alkoxy group, in which one or two hydrogen atoms are substituted by a monovalent substituent selected from the group consisting of a carboxyl group, $C_2$-$C_4$ ester group, hydroxyl group, $C_2$-$C_6$ epoxide-containing group, $C_3$-$C_6$ α,β-unsaturated acyloxy group, $C_2$-$C_3$ alkenyl group, and $C_4$-$C_8$ acid anhydride-containing group, m, n, p, q, r and s are each independently an integer of 0 to 200, the sum m+q is at least 4, the sum m+n+p is 4 to 200, and the sum m+n+p+q+r+s is 4 to 200,
   (b) an α,β-unsaturated carboxylic acid ester having a cyano group or an α,β-unsaturated nitrile,
   (c) 0.001 to 3.975% by weight, based on the total weight of components (a), (b), and (c), of an ethylenically unsaturated polyfunctional monomer, and
   (d) a photo-polymerization initiator,
   with the proviso that the composition does not comprise (e) an ethylenically unsaturated monofunctional monomer free of a cyano group,
   said polymeric material having an interpenetrating polymer network or semi-interpenetrating polymer network structure.

* * * * *